(12) United States Patent
Rudy et al.

(10) Patent No.: US 6,360,252 B1
(45) Date of Patent: Mar. 19, 2002

(54) MANAGING THE TRANSFER OF E-MAIL ATTACHMENTS TO RENDERING DEVICES OTHER THAN AN ORIGINAL E-MAIL RECIPIENT

(75) Inventors: Stephen M. Rudy, Palo Alto; Herbert D. Jellinek, Aptos, both of CA (US)

(73) Assignee: fusionOne, Inc., San Jose, CA (US)

( * ) Notice: Subject to any disclaimer, the term of this patent is extended or adjusted under 35 U.S.C. 154(b) by 0 days.

(21) Appl. No.: 09/652,761

(22) Filed: Aug. 31, 2000

Related U.S. Application Data

(60) Provisional application No. 60/155,024, filed on Sep. 20, 1999.

(51) Int. Cl.[7] .............................................. G06F 15/16
(52) U.S. Cl. ...................... 709/206; 709/207; 709/217
(58) Field of Search ................................ 709/206, 207, 709/217, 203, 229; 707/10

(56) References Cited

U.S. PATENT DOCUMENTS

| | | | | |
|---|---|---|---|---|
| 5,781,901 A | * | 7/1998 | Kuzma ........................ | 707/10 |
| 5,903,723 A | * | 5/1999 | Beck et al. .................. | 709/203 |
| 5,948,066 A | * | 9/1999 | Whalen et al. ............. | 709/229 |
| 5,951,636 A | * | 9/1999 | Zerber ........................ | 709/202 |
| 6,009,462 A | * | 12/1999 | Birrell et al. ............... | 709/206 |
| 6,073,133 A | * | 6/2000 | Chrabaszcz ................. | 707/10 |
| 6,157,630 A | * | 12/2000 | Adler et al. ................. | 370/338 |
| 6,173,310 B1 | * | 1/2001 | Yost et al. .................. | 709/201 |
| 6,195,794 B1 | * | 2/2001 | Buxton ....................... | 717/11 |

* cited by examiner

*Primary Examiner*—Zarni Maung
(74) *Attorney, Agent, or Firm*—Vierra Magen Marcus Harmon & DeNiro LLP

(57) ABSTRACT

A server machine transfers a version of an e-mail for presentation by a client machine. The version includes a user-understandable descriptor of an attachment to the e-mail but does not include the attachment. The server receives a request from the client to transfer the attachment for rendering. In response, the server obtains an output version of the attachment and transfers the output version to a rendering device, causing the rendering device to produce a rendered version of the attachment. The client machine can have a display, and the user-understandable descriptor can be visible on the display. The descriptor can be a selectable item; in response to selection of the descriptor, the server can transfer options to the client, including options that involve rendering an attachment. For an image attachment, the rendering options can include printing, sending to a copy shop, and sending to a fax machine. For a text attachment, the rendering options can include, in addition to the options for an image attachment, converting to audio. For an audio attachment, the rendering options can include listening to the attachment. If the client includes a rendering device and the server determines that the attachment can be rendered by the client's rendering device, the server can transfer an option describing transfer to the client's rendering device; for example, the client could be a wireless telephone that can render audio attachments.

67 Claims, 17 Drawing Sheets

MANAGING THE TRANSFER OF E-MAIL ATTACHMENTS TO RENDERING DEVICES OTHER THAN AN ORIGINAL E-MAIL RECIPIENT

RELATED APPLICATIONS

This patent application claims priority from U.S. Provisional Patent Application No. 60/155,024, filed on Sep. 20, 1999, entitled METHOD AND APPARATUS FOR PROVIDING MOBILE ACCESS TO COMPUTER NETWORKS, the content of which is hereby incorporated by reference in its entirety.

FIELD OF THE INVENTION

The present invention relates to techniques for transferring e-mail attachments to devices that can render them, such as printers, fax machines, or playback devices.

BACKGROUND OF THE INVENTION

Various problems can arise in presenting e-mail attachments, such as MIME attachments. An attachment typically defines a document in one of a variety of digital formats meant to accompany the body of an e-mail message, which may also comment on the document. Attachments can, for example, contain images, text, or multimedia documents, other e-mail messages, video, audio, voice, or other information.

Problems can arise in presenting an e-mail attachment using a machine with a small or unusually shaped display. Problems can also arise in presenting an attachment with a machine that has a low speed network connection. These and similar problems in presenting attachments are referred to generally herein as "attachment presentation problems".

For example, a user reading e-mail from a personal digital assistant (PDA) or mobile telephone may be able to read text of e-mail messages but may also need to know the content of attachments. The user may, however, have difficulty viewing or hearing attachments, both because the machine's display or speaker cannot present an attachment adequately and also because the machine's network connection is too slow to allow transfer of an attachment in a reasonable time. Also, the slow, inexpensive central processing units (CPUs) in these devices are often not up to the task of presenting sophisticated multimedia information. The user could view or hear the attachment by finding a regular computer with a modem to connect to the home network and view and hear attachments, but this is often impractical or impossible, and is generally an undesirable complication.

An article from Cahners In-Stat Group, entitled *Demand for Wireless Internet: Hype or Reality?*, Cahners In-Stat Group, 1999, describes a survey in which 90 percent of mobile data users pointed out the need for wireless Internet access to both send and receive e-mail, while two-thirds stated that it is either very important or extremely important to view attachments in wireless e-mail.

Based on the foregoing, there is a clearly a need to allow users of mobile devices to have access to attachments in a manner that avoids the attachment presentation problems inherent in the use of those devices.

SUMMARY OF THE INVENTION

Techniques are provided for avoiding attachment presentation problems by transferring an e-mail attachment to a device that can render it for presentation to the user. According to one aspect of the invention, the system includes a server machine, and the user's client machine, such as a mobile phone or PDA. The server can present a version of the e-mail item on the user's client, including a descriptor of the attachment rather than the entire attachment itself. If requested, the server can also transfer the attachment for rendering so that the user can perceive the attachment. The techniques thus make it possible for the user to perceive the attachment in rendered form despite the attachment presentation problems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
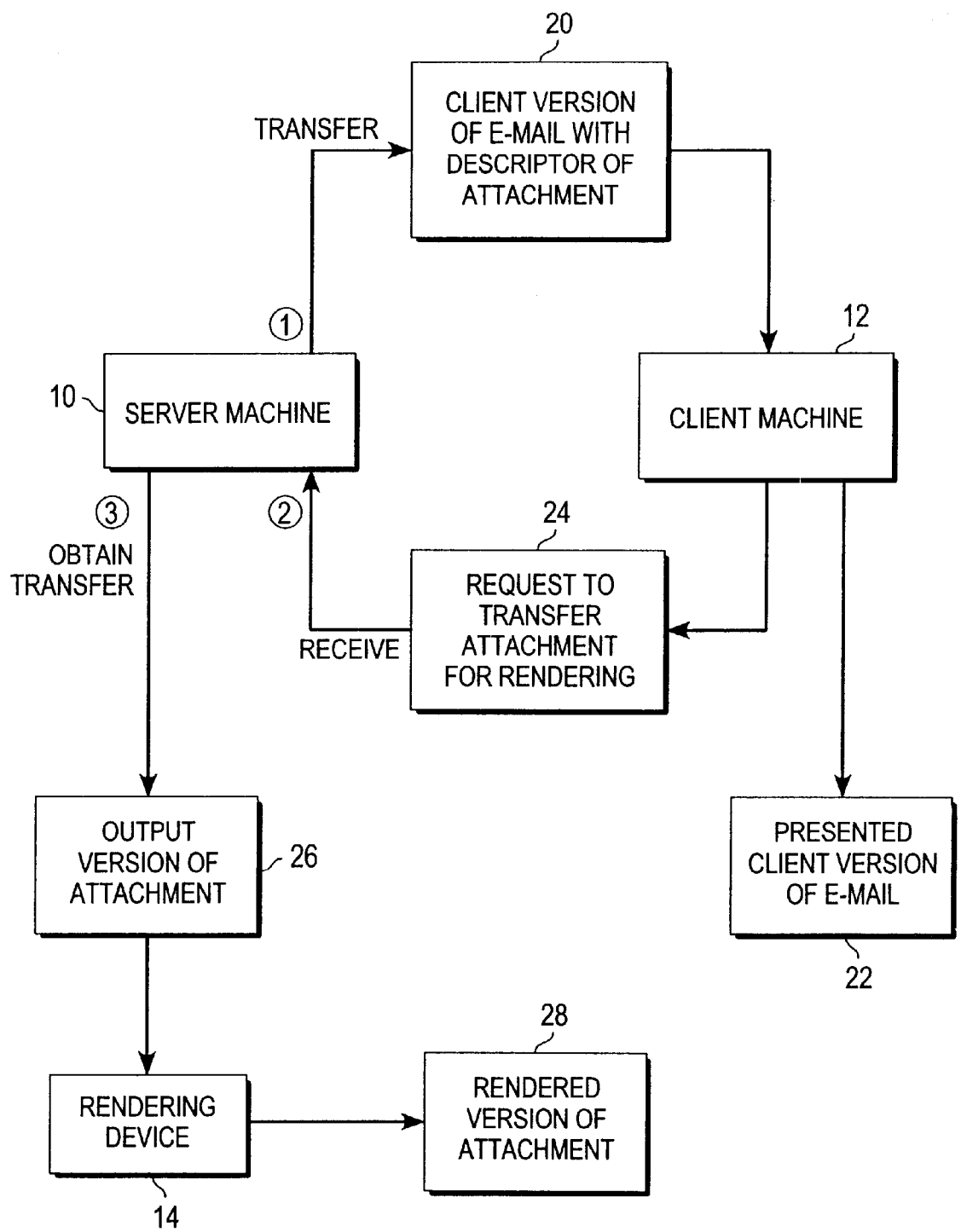
FIG. 1 is a flow diagram illustrating operations of a server machine in transferring an e-mail attachment for rendering.

A method and system for presenting attachments for users of mobile devices are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

Techniques are provided for avoiding attachment presentation problems by transferring an e-mail attachment to a device that can render it for presentation to the user. According ton one embodiment, a server that is separate from the user's device presents a version of the e-mail item on the user's client, including a descriptor of the attachment rather than the attachment itself. If requested, the server can also transfer the attachment for rendering so that the user can perceive the attachment. The techniques thus make it possible for the user to perceive the attachment in rendered form despite the attachment presentation problems.

According to one embodiment, a service processes attachments remotely and redirects them, such as to a network-addressable printer, a specialized printing facility, or a fax machine. The user can choose to have an attachment printed at a convenient location. The service provider can charge a small per-page fee. Various kinds of attachments can be handled, including calendar pages, web pages, and other documents.

The techniques can be implemented in a method of operating a server machine. The server transfers a client version of an e-mail item to the client machine. Although the e-mail item includes an attachment, the client version does not include the full attachment but includes a user-understandable descriptor of the attachment. If the user requests to transfer the attachment for rendering, the server obtains an output version of the attachment that it transfers to a rendering device, causing the rendering device to produce a rendered version of the attachment.

The server machine can have a low bandwidth connection to the client machine. For example, the client machine can be a mobile telephone or a PDA.

The client machine can have a display on which the client version is presented, and the user-understandable descriptor can be visible when the client version is presented. The client version can include a list of selectable items including the user-understandable descriptor. In response to a signal from the client machine indicating selection of the user-understandable descriptor, a second list of selectable items can be transferred to the client machine, each indicating a rendering option that can be selected by the user such as an identified rendering device or a type of rendering device.

In obtaining the output version, the information about the rendering device's type is used in converting the attachment to a form that causes the rendering device to approximate the attachment's correct rendering. For example, the rendering device's type can be indicated by a signal from the user's client machine.

In general, the information about the rendering device can be used from the request to transfer the output version to the rendering device. For example, where the request indicates a type of rendering device such as a type of printer or a type of facsimile machine, it can be determined whether rendering devices of the indicated type can approximate the attachment's correct rendering and, if so, can convert the attachment to obtain the output version. In addition, where the request includes connection information for establishing a connection with the rendering device, such as an Internet Protocol (IP) address or telephone number, the connection information can be used to transfer the output version to the rendering device.

If the user's client machine is near a shop at which the rendering device is located, information can be obtained about the location of the user's client machine. The shop may then be selected based on nearness, and the location of the shop can be provided to the user while the output version is transferred to the shop.

The techniques can also be implemented in a server machine with a processor and connecting circuitry for connecting the processor to a user's client machine. The processor can transfer a client version of an e-mail item to the client machine as described above. If the user requests to transfer the attachment for rendering, then the processor can obtain an output version of the attachment that it transfers to a rendering device, again as described above.

The techniques can also be implemented in an article of manufacture with stored instruction data defining instructions that a server machine's processor can execute. In executing the instructions, the processor can operate as described above.

Similarly, the techniques can be implemented in a method of operating a source machine to transfer data to a server machine that includes a processor. The source machine can establish a network connection to the server machine and can transfer instruction data as described above to the server machine.

An additional aspect also addresses the possibility that the user's client machine may include a device capable of rendering some types of attachments, so that it may be undesirable to transfer attachments of those types to other rendering devices. Specifically, if the client machine is a mobile phone, it will include a speaker device for rendering an audio file into audible output.

According to one embodiment, when an attachment is of a type supported by the user's client, the user may request that the attachment be forwarded to a rendering device in the user's client. The techniques can, for example, operate the server to automatically determine, for an attachment to be transferred for rendering, whether the attachment could be rendered by the client's rendering device. If so, the server can transfer a list of selectable items to the client machine for presentation, and one of the selectable items can describe transfer to the client's rendering device. If the user selects this item, the server can obtain an output version of the attachment that is appropriate for the rendering device and can transfer the output version to the client for rendering.

In comparison with conventional attachment rendering techniques, the techniques are advantageous because they can be used where there is a low bandwidth connection between the server and a user's client machine, where there is a high latency connection such as through a satellite link or a modem or Wireless Application Protocol (WAP) phone that requires time to establish connection, or where there is an unreliable or intermittent connection. In addition, the techniques are advantageous because they can be used where the client machine is not adequate to render most attachments due to storage limitations or due to inadequate output capabilities, such as a small display or a display with inadequate resolution.

Terms and Terminology

The following terms are used herein to describe various embodiments of the invention:

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between two components.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "processor" is a component of circuitry that responds to input signals by performing processing operations on data and by providing output signals. A processor may include one or more central processing units or other processing components.

A processor performs an operation or a function "automatically" when it performs the operation or function independent of concurrent human control.

An "instruction" is an item of data that a processor can use to determine its own operation. A processor "executes" a set of instructions when it uses the instructions to determine its operations.

To "obtain" or "produce" an item of data is to perform any combination of operations that begins without the item of data and that results in the item of data.

An item of data "indicates" a thing, an event, or a characteristic when the item has a value that depends on the existence or occurrence of the thing, event, or characteristic or on a measure of the thing, event, or characteristic.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

"User input circuitry" is circuitry for providing signals based on actions of a user. User input circuitry can receive signals from one or more "user input devices" that provide signals based on actions of a user, such as a keyboard or a mouse. The set of signals provided by user input circuitry can therefore include data indicating mouse operation and data indicating keyboard operation.

An "image output device" is a device that can provide output defining an image. A "display" is an image output device that provides information in a visible form. To "present an image" on a display is to operate the display so that a human can perceive the image.

An item of data "defines" an image when the item of data includes sufficient information to produce the image.

A "page" is an image that can be perceived as a single page of a form or a sheet. A "web page" is a page that satisfies the constraints applicable to the World Wide Web (WWW) user interface.

An operation "creates" a page, such as a web page, when the operation produces an item of data defining the page. An operation "transmits" a page when the operation transmits an item of data defining the page. An operation "presents" a page when the operation presents one or more images that include information from an item of data defining the page.

A "selectable item" is a display feature that is perceived as a bounded display area that can be selected. Hyperlinks and menu items are examples of selectable items. A selectable item "indicates" a thing, an event, or a characteristic when the selectable item includes text or other visible information indicating the thing, event, or characteristic. A selectable item "identifies" a thing, an event, or a characteristic that is one of a set when the selectable item includes text or other visible information indicating the thing, event, or characteristic and not indicating any of the other elements in the set.

The term "select", when used in relation to a selectable item, means an action by a user that uniquely indicates the selectable item.

The term "machine" refers herein to a machine that includes at least one processor and its input/output circuitry.

The terms "server machine" (or "server"), "client machine" (or "client"), and "request" describe a relationship between machines that can be connected through a network: A "server machine" is a machine that performs services in response to "requests" it receives from one or more "client machines". In this context, a "request" is an item of data transferred from a client to a server that has a value indicating a service or operation to be performed by the server.

A connection between a server machine and a client machine is a "low bandwidth connection" in a given context if the connection has insufficient capacity to transfer items of data at a desired rate with perfect fidelity. The capacity of the connection may be limited, for example, by software or hardware constraints, with storage capacity being one example of a hardware constraint that can reduce capacity. In some contexts, a low bandwidth connection is any connection with a transfer speed below 56 kilobits per second. In contexts in which items of data are transferred for presentation to a user, a low bandwidth connection could be a connection that is not always able to transfer items of data at a sufficient speed to obtain the intended perceptual effect.

An "e-mail service" is a service provided by a server machine by which the server machine can transfer a human-readable message, referred to as an "e-mail message", electronically from a client machine, referred to as the "sending machine", to one or more client machines, referred to as "recipient machines". An e-mail message is typically composed through a user interface provided by the sending machine and is typically read through a user interface provided by a recipient machine.

An "e-mail item" is an item of data that defines an e-mail message. An e-mail item can be transferred from a sending machine to a server machine and from a server machine to a recipient machine.

An "attachment" is an item of data that is included in and accessible in an e-mail item but is not part of the e-mail message defined by the e-mail item. For example, many e-mail items include attachments in Multipurpose Internet Mail Extensions (MIME) or other formats, possibly defining still or video images, text or multimedia documents, other e-mail messages, audio segments, voice recordings, or other information.

A "version" of a first item such as an e-mail item or an attachment is a second item of data that is obtained using the first item and that includes information from the first item. In general, the second item may be identical to the first item, or it may be modified by omitting parts of the first item, by changing parts of the first item, by converting the first item from one form or format to another, or by other processes that result in a modified version. For example, a version of an e-mail item might include the portion of the e-mail item that defines an e-mail message but might not include attachments that are included in the e-mail item. Or a version of an attachment might include substantially all the information in the attachment, but in a form or format that permits rendering of the attachment. Or a version of an attachment might result from rendering of the attachment.

To "render" an attachment is to convert the attachment into a form in which it is perceptible or understandable to a human. Examples include converting an attachment to a displayed image, to a hardcopy, to an audio playback, from text form to speech, and so forth. Rendering can include conversion at any level; for example, a text could be rendered by translating it from a first language to a second and then printing the version of the text in the second language.

A "rendering device" is a device that can perform rendering for at least some attachments.

A "descriptor" of an attachment is a concise item of data that describes or otherwise identifies the attachment. For example, if the content of the attachment is a digital image file, a descriptor of the attachment may indicate the name of the image file and/or a small thumbnail of the image. Similarly, if the content of the attachment is a text file, then a descriptor of the attachment may indicate the name of the text file and/or the first few lines of the text file. A "user-understandable descriptor" is a descriptor that includes information that can be understood by a user.

System Overview

Referring to FIG. 1, it illustrates a server machine 10 and a client machine 12 configured according to an embodiment of the invention. Server machine 10 performs operations that present an e-mail attachment for a user who has client machine 12, using rendering machine 14.

In an operation designated by a circled 1, server machine 10 transfers client version 20 to client machine 12 for presentation by the client machine 12, as illustrated by presented client version 22. Client version 20 is a version of an e-mail item. The e-mail item includes an attachment, and client version 20 includes a user-understandable descriptor of the attachment; but client version 20 does not include the attachment itself.

In an operation designated by a circled 2, server machine 10 receives request 24 from client machine 12, a request to transfer the attachment for rendering.

In an operation designated by a circled 3, server machine 10 responds to request 24 by obtaining output version 26 of the attachment and by transferring output version 26 to rendering device 14. Output version 26 causes rendering device 14 to produce rendered version 28, a rendered version of the attachment.

Figure 2:
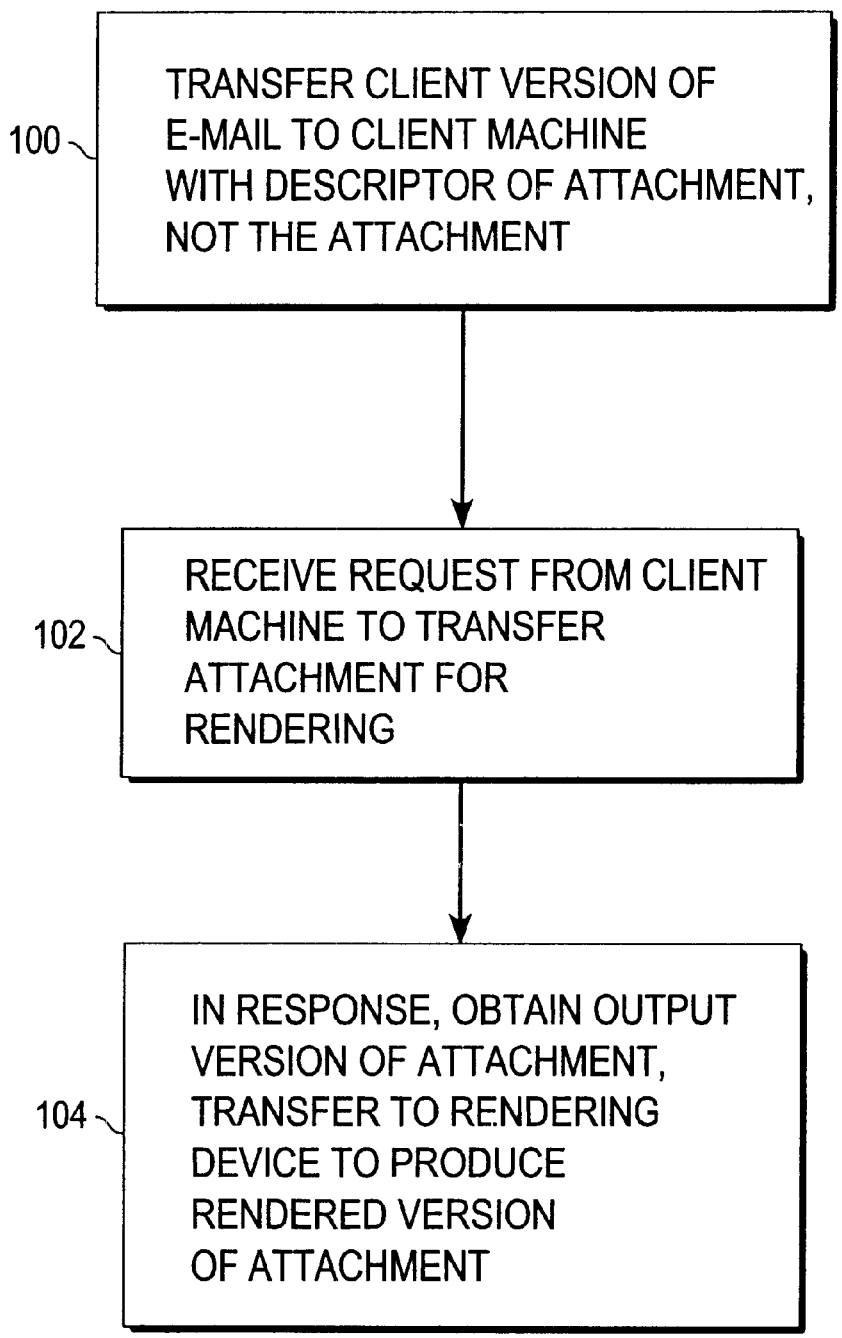
FIG. 2 is a flowchart of a general method by which a server machine transfers an email attachment for rendering.

In FIG. 2, the act in box 100 begins by transferring a client version of an e-mail item to a user's client machine for presentation by the client machine. The client version includes a user-understandable descriptor of an attachment but not the attachment.

The act in box 102 receives a request from the client machine to transfer the attachment for rendering.

The act in box 104 responds to the request by obtaining an output version of the attachment and transferring the output version to a rendering device. The output version causes the rendering device to produce a rendered version of the attachment.

Figure 3:
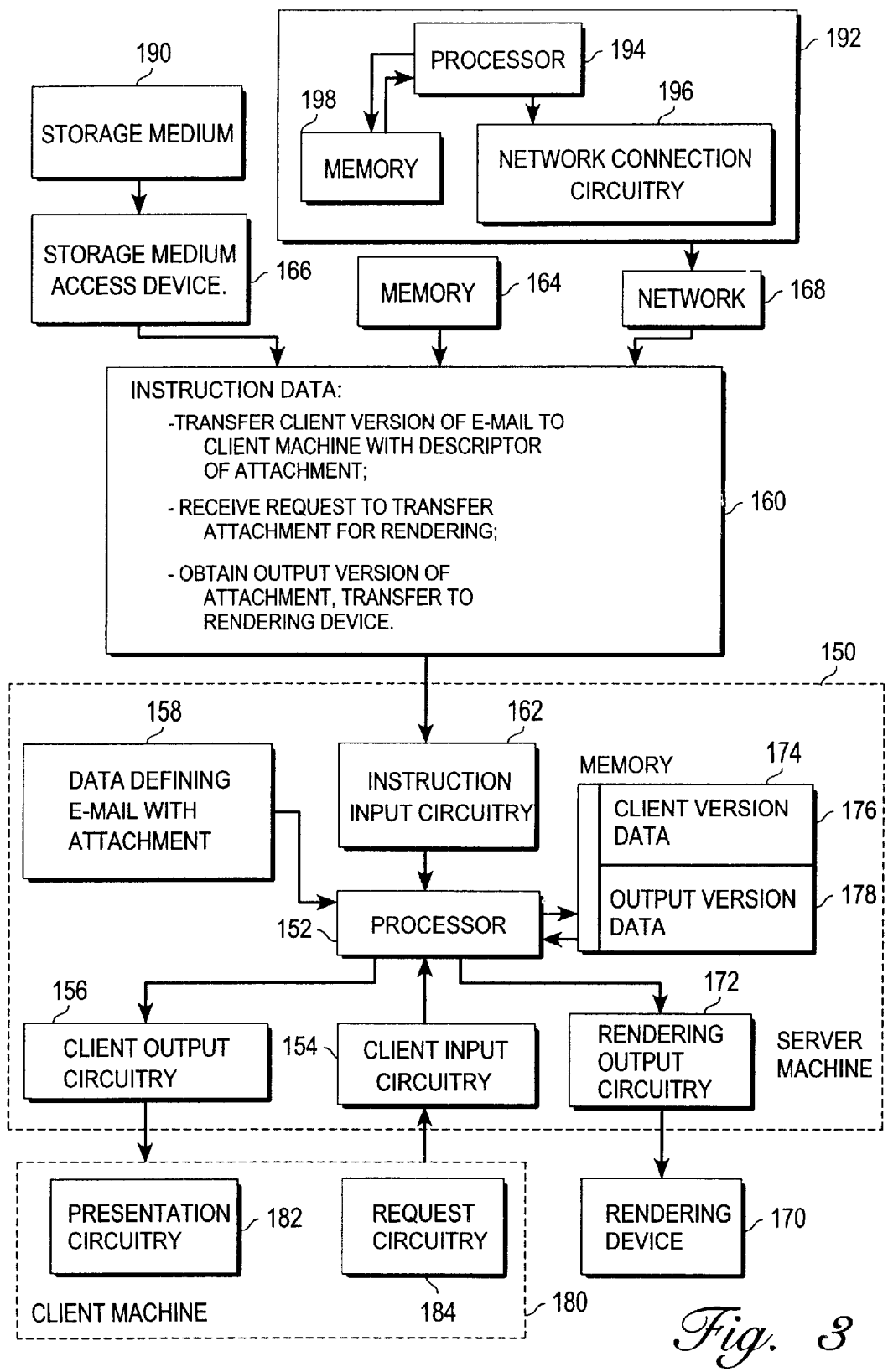
FIG. 3 is a schematic diagram showing general components of a system in which a server machine can transfer e-mail attachments for rendering.

Server machine 150 in FIG. 3 includes processor 152 connected for receiving signals from a user's client machine 180 through client input circuitry 154 and for providing signals to client machine 180 through client output circuitry 156. Processor 152 can also be connected for accessing e-mail data 158, which define an e-mail item that has an attachment.

Processor 152 is also connected for receiving instruction data 160 indicating instructions through instruction input circuitry 162, which can illustratively provide instructions received from connections to memory 164, storage medium access device 166, or network 168.

Processor 152 is also connected for providing signals to rendering device 170 through rendering output circuitry 172.

Finally, processor 152 can also be connected to memory 174, illustratively storing client version data 176 and output version data 178.

Client machine 180 includes presentation circuitry 182 for presenting versions of email items and request circuitry 184 for providing requests.

In executing the instructions indicated by instruction data 160, processor 152 transfers a client version of the e-mail item defined by data 158 through client output circuitry 156 to client machine 180 for presentation, such as by presentation circuitry 182. The client version includes a user-understandable descriptor of the attachment but not the attachment. Processor 152 receives a request through client input circuitry 154 from client machine 180, such as from request circuitry 184; the request is to transfer the attachment for rendering. Processor 152 responds to the request by obtaining an output version of the attachment and transferring the output version to rendering device 170 through rendering output circuitry 172. The output version causes rendering device 170 to produce a rendered version of the attachment.

Processor 152 could obtain client version data 176 defining the client version that is transferred to client machine 180, and could obtain output version data 178 defining the output version that is transferred to rendering device 170.

As noted above, FIG. 3 illustrates three possible sources from which instruction input circuitry 162 could receive data indicating instructions--memory 164, storage medium access device 166, and network 168.

Memory 164 could be any conventional memory within server machine 150, including random access memory (RAM) or read-only memory (ROM), or could be a peripheral or remote memory device of any kind. For example, memory 164 and memory 174 could be implemented in a single memory device.

Storage medium access device 166 could be a drive or other appropriate device or circuitry for accessing storage medium 190, which could, for example, be a magnetic medium such as a set of one or more tapes, diskettes, or floppy disks; an optical medium such as a set of one or more CD-ROMs; or any other appropriate medium for storing data. Storage medium 190 could be a part of server machine 150, a part of another server or other peripheral or remote memory device, or a software product. In each of these cases, storage medium 190 is an article of manufacture that can be used in server machine 150. Data units can be positioned on storage medium 190 so that storage medium access device 166 can access the data units and provide them in a sequence to processor 152 through instruction input circuitry 162. When provided in the sequence, the data units form instruction data 160, indicating instructions as illustrated.

Network 16 can provide instruction data 160 received from machine 192. Processor 194 in machine 192 can establish a connection with processor 152 over network 168 through network connection circuitry 196 and instruction input circuitry 162. Either processor could initiate the connection, and the connection could be established by any appropriate protocol. Then processor 194 can access instruction data stored in memory 198 and transfer the instruction data over network 168 to processor 152 so that processor 152 can receive instruction data 160 from network 168. Instruction data 160 can then be stored in memory 174 or elsewhere by processor 152, and can be executed.

The general features described above could be implemented in numerous ways on various server machines to transfer e-mail attachments for rendering. It is expected that the proposed implementation described below can be implemented on several computer CPU architectures and operating systems, including Microsoft Windows NT 4.0/Intel x86, Sun Solaris 7/Intel x86, Sun Solaris 7/Sun UltraSPARC running atop an Apache 1.3 Web server using the Apache JServ module to run a custom set of servlets compiled from Java programming language source code. The proposed implementation described below uses the WAP (Wireless Application Protocol) protocols, including WML (Wireless Markup Language) 1.0 and WML 1.1, to present information to and receive information from mobile client devices.

System Architecture

According to one embodiment, a server computer exchanges information with client machines that are cellular telephones or PDAs, providing access to information through a network. The server provides a number of services to users of the client machines, including but not limited to access to calendars; access to electronic mail folders, messages, and attachments such as documents; access to chat rooms; instant messaging; and access to address books. The server can reformat all information for display in a manner appropriate to the information, the client machine, and the user.

The server can provide secure wireless access directly to corporate and personal information, providing transparent, ubiquitous, and live management of calendars, e-mail, chat rooms, instant messaging, address books, and other server-based tools. As a result, a user can have one e-mail address, one calendar, and one address book no matter where the user is. A user with access to a client machine can work directly on his or her own network without synchronizing information among various intermediary networks. The user's network identity can be portable and unbounded.

Figure 4:
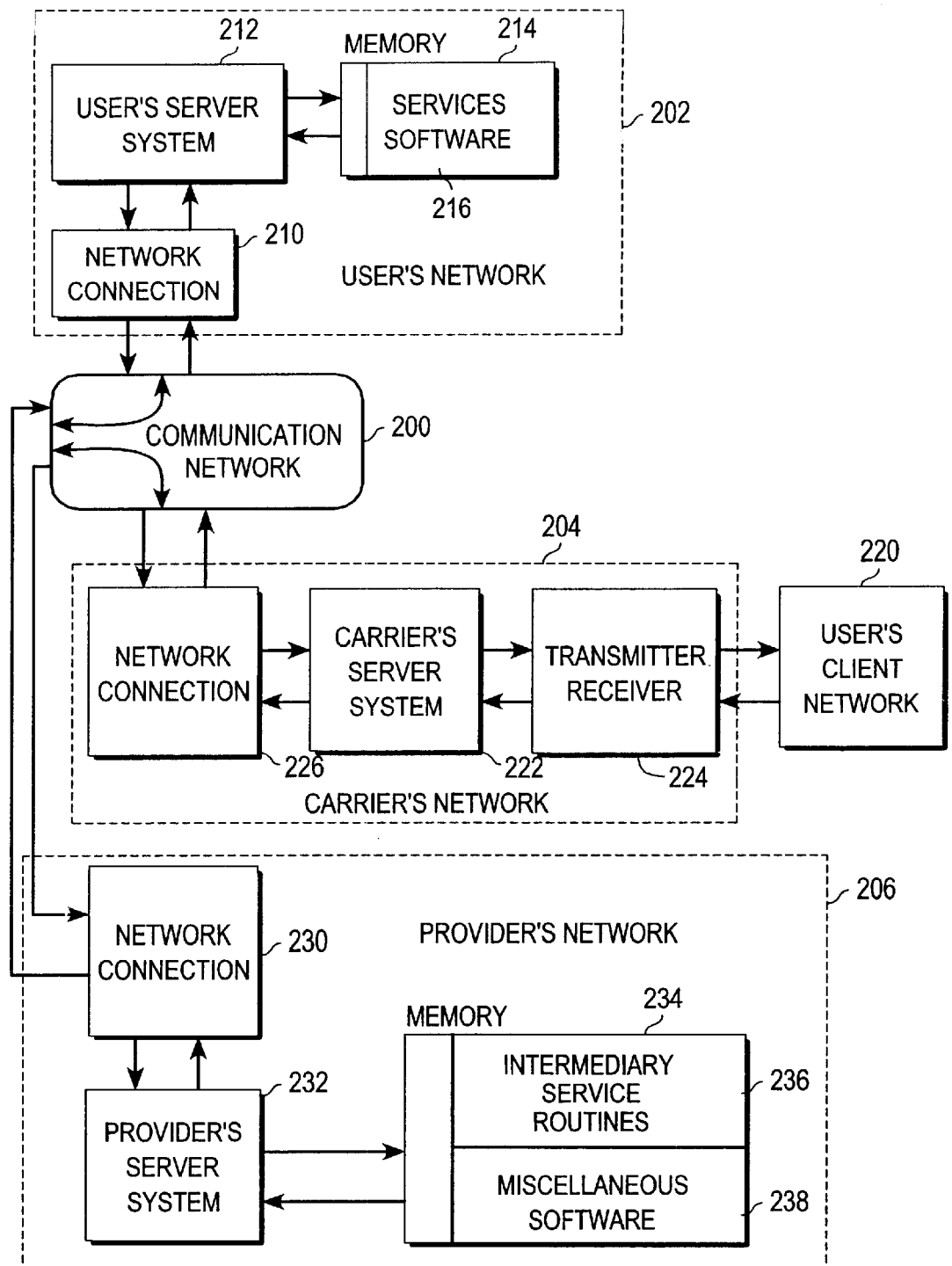
FIG. 4 is a schematic diagram showing components of a system in which an intermediary server (IMS) provides services to a user of a client machine.

FIG. 4 shows an architecture for wireless access to an individual's primary server that eliminates the need for separate identities. In the illustrated architecture, a wireless device becomes a live terminal directly linked to a network in a secure fashion. Therefore, it is irrelevant whether the individual user is accessing e-mail, a calendar, or other services from a desktop personal computer directly connected to the network, from a laptop or other portable computer linked to the network by a landline, or from a wireless device such as a cellular phone, PDA, or interactive pager.

In FIG. 4, communication network 200 provides communication links between three components—user's network 202, carrier's network 204, and provider's network 206. These components can be implemented with conventional techniques, except as noted below, and communication network 200 could be the public Internet, a private intranet, or another suitable communication network.

User's network 202 can be a conventional intranet or a conventional network of an Internet service provider through which a user has access to communication network 200. Network 202 includes network connection 210 and user's server system 212, which could include one or more server machines providing local and remote users with conventional network services such as an IMAP4 server for mail storage, a POP3 server for SMTP mail transmission, an LDAP server for directory or address book maintenance, a chat server, and so forth. Memory 214 illustratively stores services software 216 which a server machine could execute to provide services.

Carrier's network 204 can be a conventional network of a communication provider such as a telephone provider, cellular provider, paging company, etc., through which the user has communication services using client machine 220. Client machine 220 could, for example, be a wireless telephone, a PDA, a laptop or other portable computer, a pager, or any other machine capable of functioning as a client communicating with carrier's server system 222 in carrier's network 204 through transmitter/receiver 224. In the current implementation, client machine 220 has been successfully implemented with a conventional wireless telephone such as a Motorola P7389 or a Nokia 7110 executing a conventional Wireless Markup Language (WML) browser such as Phone.com's UP Browser 3.1 or UP Browser 4.0, and experiments have shown that client machine 220 could be implemented with a PDA such as a Palm Pilot V, but client machine 220 could be any other suitable machine with any other suitable user interface. The link between client machine 220 and transmitter/receiver 224 could thus be implemented with WAP or any other suitable protocol and could be provided over a wireless, wired, or hybrid connection.

In the architecture in FIG. 4, carrier's network also includes network connection 226, to provide connection between client machine 220 and communication network 200. Provider's network 206 similarly includes network connection 230. Communications between network connections 210, 224, and 230 can be implemented in a conventional manner, and can be protected using a Virtual Private Network (VPN) or another suitable protocol for providing secure links through communication network 200. Each of the Internet connections can be implemented with a firewall and other appropriate security protections.

Provider's network 206 also includes provider's server system 232, which can be implemented with one or more conventional machines such as a Sun Microsystems Enterprise 450. Machines in provider's server system 232 can provide conventional network services such as an Internet Mail Access Protocol 4 (IMAP4) server or other appropriate server for mail storage and retrieval, a POP3 server employing Simple Mail Transfer Protocol (SMTP) or other appropriate server for mail transmission, a Lightweight Directory Access Protocol (LDAP) server or other appropriate server for directory or address book maintenance, a chat server, and so forth. In addition, in the current implementation, provider's server system 232 provides an intermediary server (IMS) implemented with an Apache 1.3 Web server using the Apache JServ module running a custom set of servlets. Memory 234 illustratively stores intermediary services software 236 which a server machine could execute to provide intermediary services and miscellaneous software 238 which a server machine could execute to provide other services or to perform other functions.

As suggested by the bi-directional arrows inside communication network 200, the IMS acts as an intermediary during communication between client machine 220 and user's server system 212.

Operation Details

Figure 5:
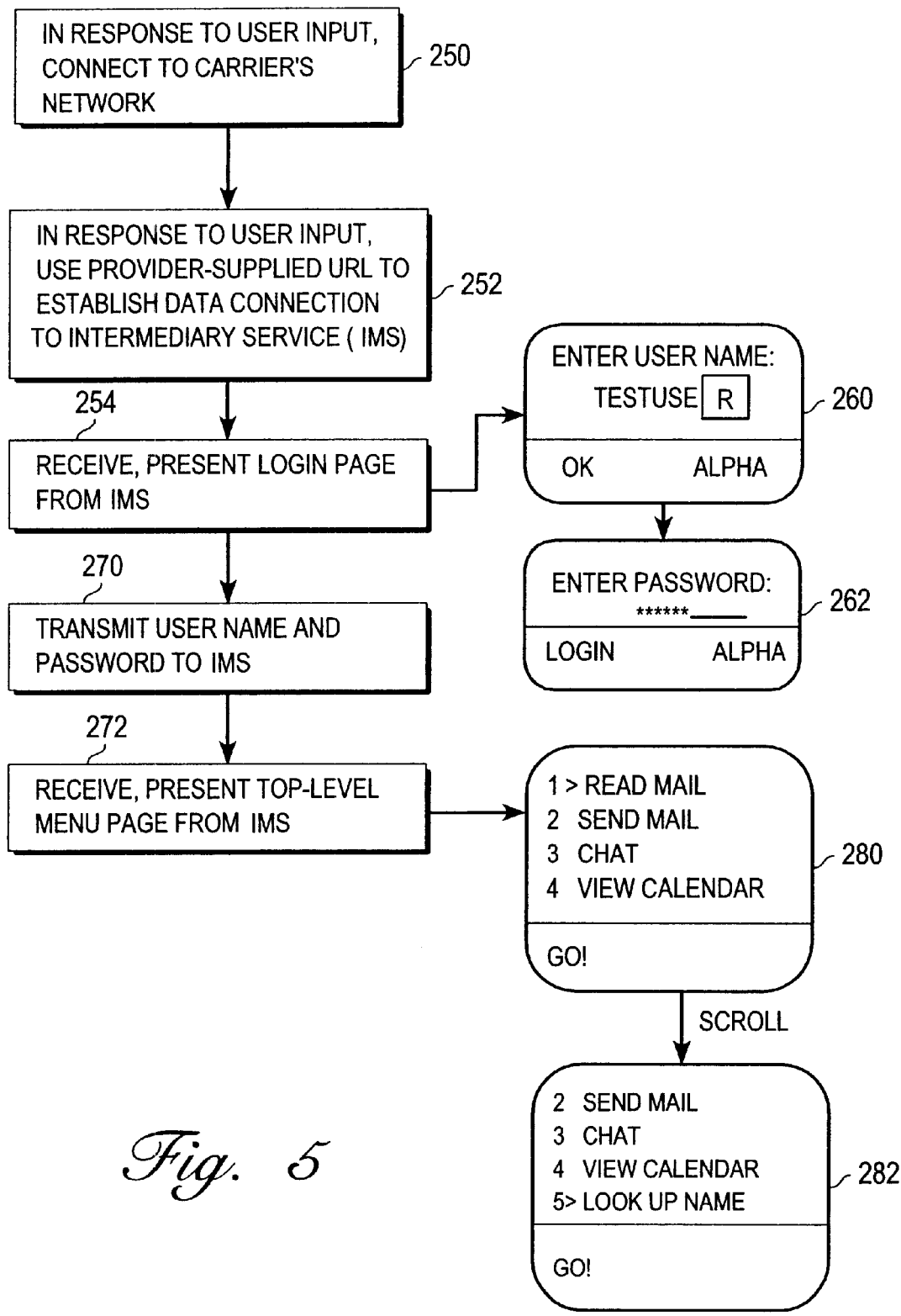
FIG. 5 is a flowchart showing operations of a client machine in establishing connection to the IMS in the system of FIG. 4.

FIG. 5 illustrates operations of client machine 220 in establishing connection with the IMS, making it possible for the user to request intermediary services.

In box 250, in response to user input, client machine 220 establishes connection to carrier's network 204. This can be accomplished in a conventional way, such as by transmitting a dial-in number that the user manually enters or selects, such as from a menu showing numbers stored in memory of client machine 220.

When connected to carrier's network 204, in response to further user input, client machine 220 uses a provider-supplied Universal Resource Locator (URL) to establish a data connection to the IMS, as shown in box 252. Here again, the user can manually enter the URL or can select it, such as from a menu of stored URLs. A server in carrier's server system 222 responds to the URL by establishing the data connection between client machine 220 and the IMS, performing conventional operations, and submits the URL to the IMS.

In response to the URL, the IMS sends a WML login or authentication page to client machine 220, enabling the user to log into the IMS. Client machine 220 receives and presents the login page, in box 254. For example, client machine 220 can present a first part of the login page requesting that the user enter a user name, as shown by display image 260. When the user has entered a user name, such as by pressing the numeric buttons on the keypad of a wireless telephone, the user can press a button adjacent the "OK" label to store the user name temporarily and to obtain display of a second part of the login page. In response, client machine 220 can present the second part of the login page requesting that the user enter a password, as shown by display image 262. When the user has entered a password, illustratively disguised by asterisks, the user can press a button adjacent the "Login" label to request that the client machine 220 transmit the user name, here "testuser", and the password to the IMS.

In response to the user pressing the button labeled "Login", client machine 220 transmits the user name and password to the IMS using the standard WML and Hypertext Transfer Protocol (HTTP) mechanism "POST", as shown in box 270.

In response to the user name and password, the IMS uses them to access a database of authorized users. If the user name and password are both valid and match, data is stored indicating that the user is "logged in". Then, the IMS sends a WML top-level menu page to client machine 220, listing the main set of operations the user can perform through the IMS.

Login could be implemented in various ways other than with the specific features shown in boxes display images 260 and 262 and in box 270. For example, a first part of the login page requests that the user enter a personal identification number (PIN) and a second part requests that the user enter a user identifier (ID). In this implementation, the PIN and ID are used in login rather than a user name and password.

Client machine 220 receives and presents the top-level menu page, in box 272. For example, as shown by display image 274, client machine 220 can present a first part of the top-level menu page showing the beginning of the list of operations, as shown by display image 280. If the device's display is not large enough to display all of the menu items, when the user requests scrolling, such as by pressing a scroll button, client machine 220 can present a second part of the top-level menu page with a sub sequent part of the list of operations, as shown by display image 282.

As illustrated, client machine 220 presents the top-level menu page as a list of numbered lines, each line including a short description of a service such as "Read mail", "Send mail", "Chat", "View calendar", and "Look up name". A top-level menu page could include various other such lists and items could be presented differently; for example, in a variation on the illustrated implementation, the lines of the top-level menu page include the following descriptions: "Read mail", "Send mail", "Chat", "View calendar", "Look up name", and "Log out", which can be selected to log out directly, and the items are presented without numbers before them.

In the illustrated implementation, client machine 220 also presents a ">" symbol as a cursor to indicate the current selection, with the first item in the list being the default current selection. The user can then change the current selection by requesting scrolling to move the ">" symbol up or down until it is positioned to the left of a desired operation. When a desired operation is selected, the user can press a button adjacent the "Go!" label to request that the client machine 220 transmit a request for the desired operation to the IMS.

The term "scroll", as used herein, thus refers to two related operations that can be implemented together or separately. One operation scrolls by moving a display image with respect to a virtual workspace such as a page; an example is upward or downward scrolling as illustrated by display images 280 and 282. Another operation scrolls by moving a cursor that indicates current selection from one selectable item to another; an example is movement of the ">" symbol from one item in a menu to another, as shown in display images 280 and 282. Scrolling can generally be implemented using up-down keys or pads or using next-previous buttons or buttons adjacent next-previous labels. In response to an up or down signal, client machine 220 can move the cursor to the next selectable item in the indicated direction unless the cursor is not currently in the display image, in which case client machine 220 can advance the display image position by one line in the indicated direction.

According to one embodiment, the top-level menu page is the starting point for all IMS capabilities. The manner in which the IMS responds to requests for operations from the top-level menu, according to one embodiment, is described below.

Top-level Intermediary Server Operations

The five operations on the menu illustrated by display images 280 and 282 have been implemented as follows in a current implementation.

The Read Mail Operation

Figure 6:
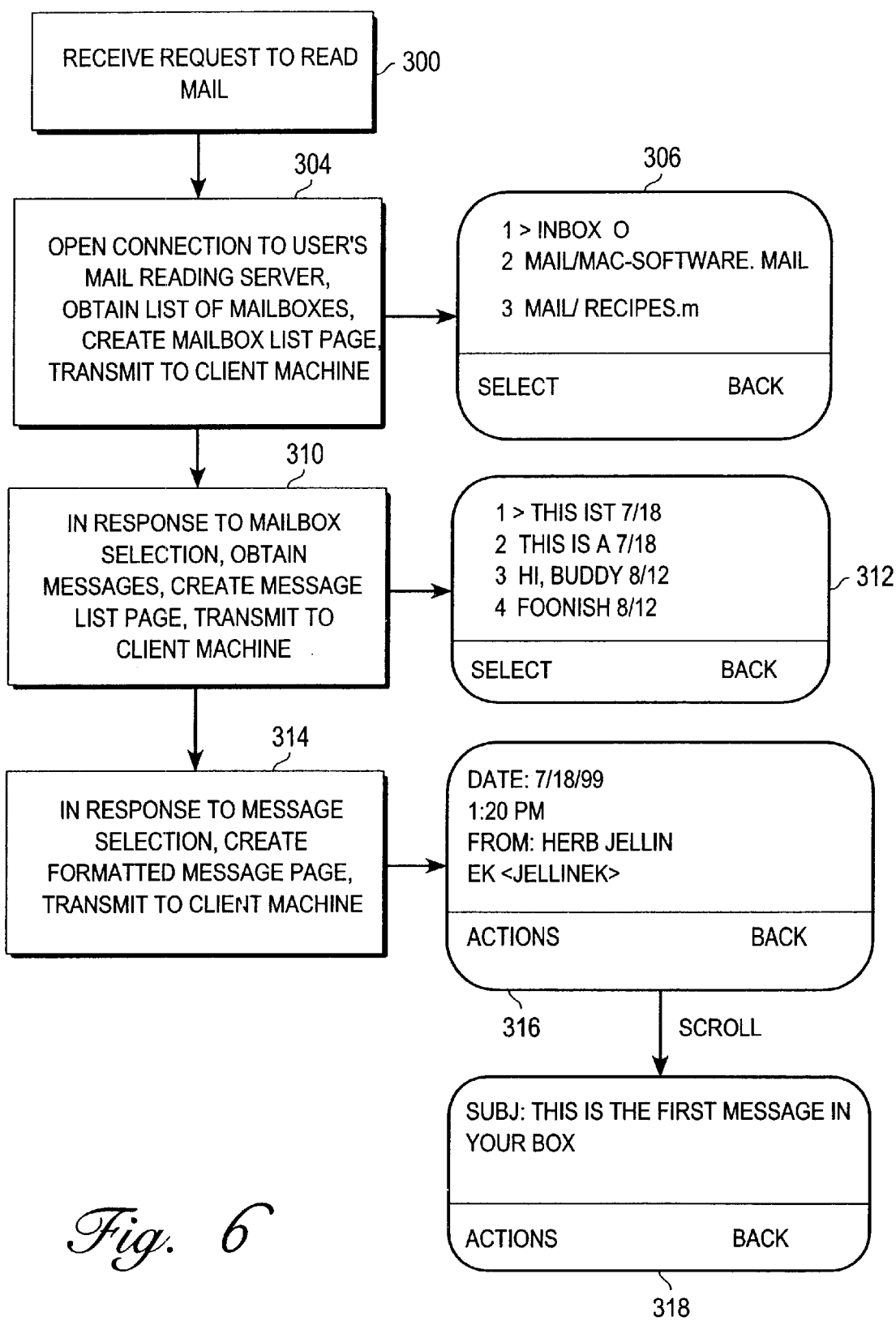
FIG. 6 is a flowchart showing operations of the IMS of FIG. 4 in response to a request to read mail.

In one embodiment, the top-level menu always includes the "Read mail" operation. FIG. 6 illustrates acts performed by the IMS in response to a request for the "Read mail" operation. In general, each act performed by the IMS involves the execution of one or more servlets.

In box 300, the IMS receives the request for the "Read mail" operation from client machine 220. In response to the request received in box 300, the IMS opens a secure connection to user's network 202 using Transport Layer Security (TLS) such as a Secure Socket Layer (SSL) 3.0-based tunnel. Many conventional IMAP4 and other servers are able to maintain such a tunnel, or appropriate software could be loaded and run on user's server system 212 to maintain such a tunnel. Once the tunnel is established, the IMS has a secure connection across communication network 200 to user's server subsystem 212.

In order to perform the "Read mail" operation, the IMS opens a connection to the user's mail reading server, an IMAP4 server in one embodiment, in box 304. The IMS also obtains from the user's mail reading server a list of the user's mailboxes, and uses the list to create a WML mailbox list page. The IMS then transmits the mailbox list page to client machine 220.

Display image 306 is an example of how a mailbox list page appears when presented. As illustrated, client machine 220 presents the mailbox list page as a list of numbered items, each item including a mailbox name such as "Inbox", which is where new messages arrive; "Mail/mac-software.mail"; and "Mail/recipes.mail". As in box 280 in FIG. 5, client machine 220 also presents a ">" symbol as a cursor to indicate the current selection, with the first item in the list being the default current selection; in the illustrated example, the last mailbox name is truncated due to screen size, but when the user selects it by moving the cursor to it, the mailbox name can scroll horizontally to provide a full display of "Mail/recipes.mail". Client machine 220 also presents a number after the Inbox, indicating the number of new messages that have not yet been viewed, referred to as "unseen" new messages. In image 306, the Inbox has zero unseen new messages. When a desired mailbox is the current selection, the user can press a button adjacent the "Select" label to request that the client machine 220 transmit a request to view the messages in the selected mailbox to the IMS.

In box 310, the IMS responds to user selection of a mailbox by again connecting to the user's mail reading server to obtain the messages in the mailbox from the user's mail server. The IMS uses the messages to create a WML message list page, which it transmits to client machine 220.

A message list page could have any appropriate format. Display image 312 is an example of a message list page that is presented by client machine 220 as a list of numbered items, each item including a message's subject line, truncated if necessary, and the date of the message, or, if today's date, the message's time of creation. Alternatively, a message list page could be presented as a list in which the subject line is replaced, for example, by the message's "From" line. The user could choose the format of message list pages in advance through an appropriate user interface within user's network 202. As above, client machine 220 also presents a ">" symbol as a cursor to indicate the current selection, with the first item in the list being the default current selection. When a desired message is the current selection, the user can press a button adjacent the "Select" label to request that the client machine 220 transmit a request to view the selected message to the IMS.

In box 314, the IMS responds to user selection of a message by using the selected message to create a WML formatted message page, which it transmits to client machine 220. A formatted message page could similarly have any appropriate format, although it is typically useful to create a concisely reformatted version that is optimized for the display constraints of client machine 220, such as a small screen. For example, as shown by display image 316, client machine 220 can present a first part of a formatted message page showing the beginning of a reformatted version of the message. If the device's display is not large enough to display all of the reformatted version, when the user requests scrolling, such as by pressing a scroll button, client machine 220 can present a second part of the formatted message page with a subsequent part of the list of operations, as shown by display image 318. Display images 316 and 318 illustrate a reformatted version that includes a list of items, each beginning with a subject such as "Date:", "From:", "Subj:", and so forth. The message's header lines can either be reformatted or suppressed altogether to better fit the screen and to minimize transmission time.

The Send Mail Operation

Figure 7:
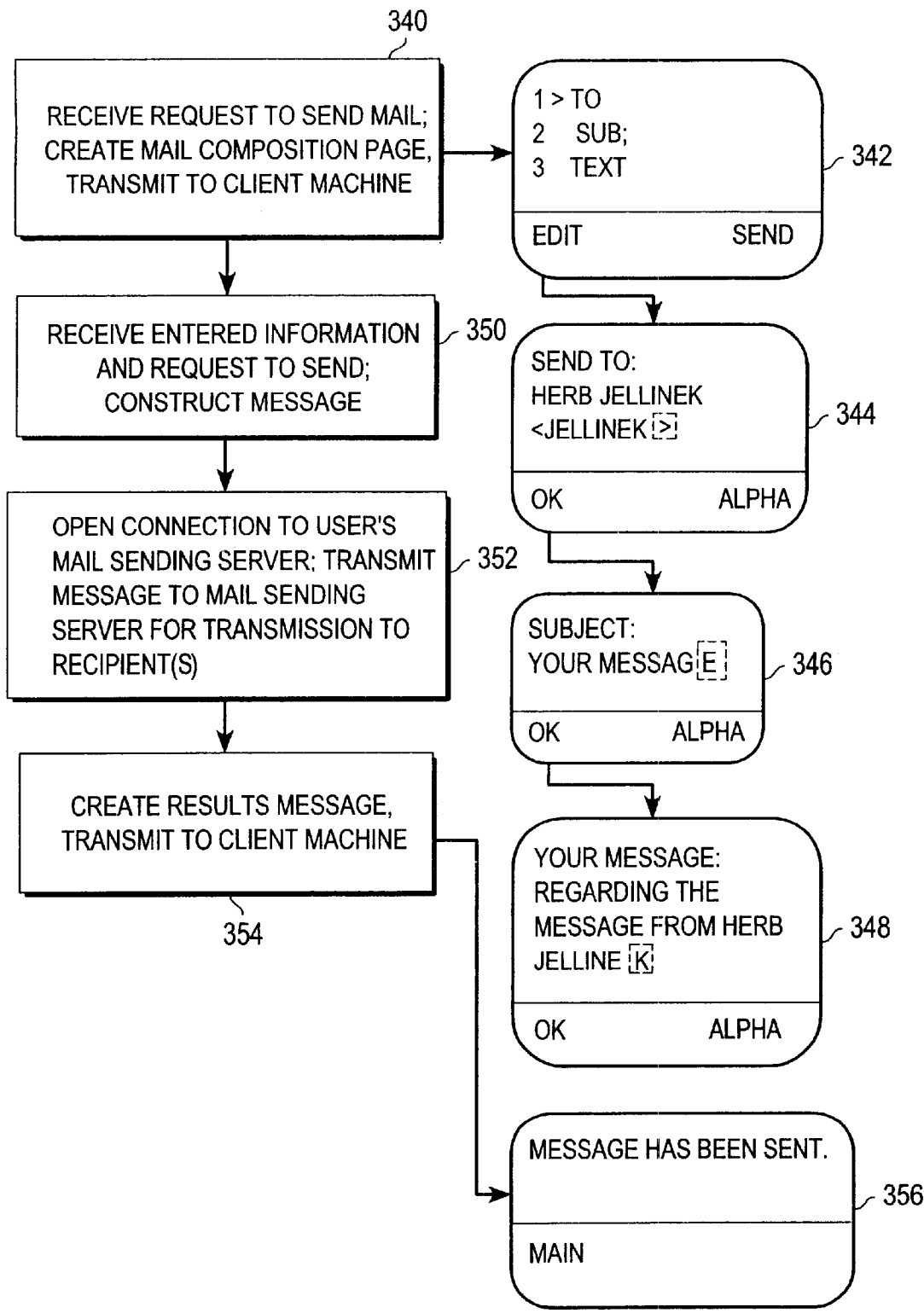
FIG. 7 is a flowchart showing operations of the IMS of FIG. 4 in response to a request to send mail.

In one embodiment, the top-level menu always includes the "Send mail" operation. FIG. 7 illustrates acts performed by the IMS in response to a request for the "Send mail" operation. As above, each act performed by the IMS involves the execution of one or more servlets. In box 340, the IMS receives the request for the "Send mail" operation from client machine 220. In response, the IMS creates a mail composition page and transmits it to client machine 220.

An example of a mail composition page in response to a "Send mail" request is shown by display images 342, 344, 346, and 348. A first part of the page, shown in image 342, provides a list of numbered items, each item including a brief description of a message field that can be edited. As above, client machine 220 also presents a ">" symbol as a cursor to indicate the current selection, with the first item in the list being the default current selection. When a desired message field is the current selection, the user can press a button adjacent the "Edit" label to request that client machine 220 present another part of the mail composition page so that the user can edit the selected message field. When the user completes editing, the user can press a button adjacent the "Send" label to request that client machine 220 send the edited message fields and a request to send the message to the IMS.

A second part of the page, shown in image 344, is presented when the user presses the "Edit" button when the "To" message field is selected. Image 344 elicits the address to which a message is to be sent; in the example, the user has entered "Herb Jellinek <Jellinek>" or this address has been included in the page by default, allowing the user to change it. When the user indicates the address is complete by pressing a button adjacent the "OK" label, client machine returns to the first part of the page, as shown in image 342, and the user can then scroll the cursor to select another message field.

A third part of the page, shown in image 346, is presented when the user presses the "Edit" button when the "Subj" message field is selected. Image 346 elicits the subject of the message; in the example, the user has entered "Your Message". When the user indicates the subject is complete by pressing a button adjacent the "OK" label, client machine returns to the previously shown part of the page, similar to the part shown in image 342, and the user can then scroll the cursor to select another message field.

A fourth part of the page, shown in image 348, is presented when the user presses the "Edit" button when the "Text" message field is selected. Image 348 elicits the body of the message. In the example, the user has entered "Regarding the message from Herb Jellinek". When the user indicates the text is complete by pressing a button adjacent the "OK" label, client machine returns to the previously shown part of the page, similar to the part shown in image 342, and the user can then scroll the cursor to select another message field.

When the user has completed all the fields as desired, the user can press a button adjacent the "Send" label to request that a message be sent in accordance with the entered information.

In box 350, the IMS receives the entered information and the request to send from box 340. In response, the IMS constructs a message in accordance with the entered information and in the correct format to be sent.

The IMS opens a secure connection to user's server subsystem 212, as described above. In order to perform the "Send mail" operation, the IMS opens a connection to the user's mail sending server, an SMTP server in one embodiment, in box 352. The IMS then transmits the message to the user's mail sending server for transmission to the recipient(s).

Although the IMS could use an SMTP server in provider's server system 232 to transmit the message, this could be problematic because addresses local to user's network 202 would not be accessible.

Based on the result of the transmission, IMS then creates a results page and transmits it to client machine 220, in box 354. Display image 356 illustrates an example of a results page indicating that a message has been successfully sent. Other results pages could detail problems that occurred in delivering a message.

The Chat Operation

In one embodiment, the top-level menu could include the "Chat" operation. This operation is useful when one has immediate communication needs that e-mail or a voice telephone call cannot fulfill. For example, if one needs to consult a group of people or any single member of a group, interactive text chat may be a better solution.

To enable the IMS to provide the "Chat" service to a group of people, a counterpart chat server program must be running on User's Server System 212 or another network that is accessible to all of the people in the group. Similarly, to enable users of other computers to participate, their computers must be running a counterpart chat client program, which can, for example, provide a graphical user interface. The chat server and chat client programs can be implemented with conventional techniques, such as those used to implement commercially available chat software. One embodiment uses conventionally implemented chat server and chat client programs that could be replaced by Yahoo! Messenger or AOL Instant Messenger with minimal change to the rest of the system.

Figure 8:
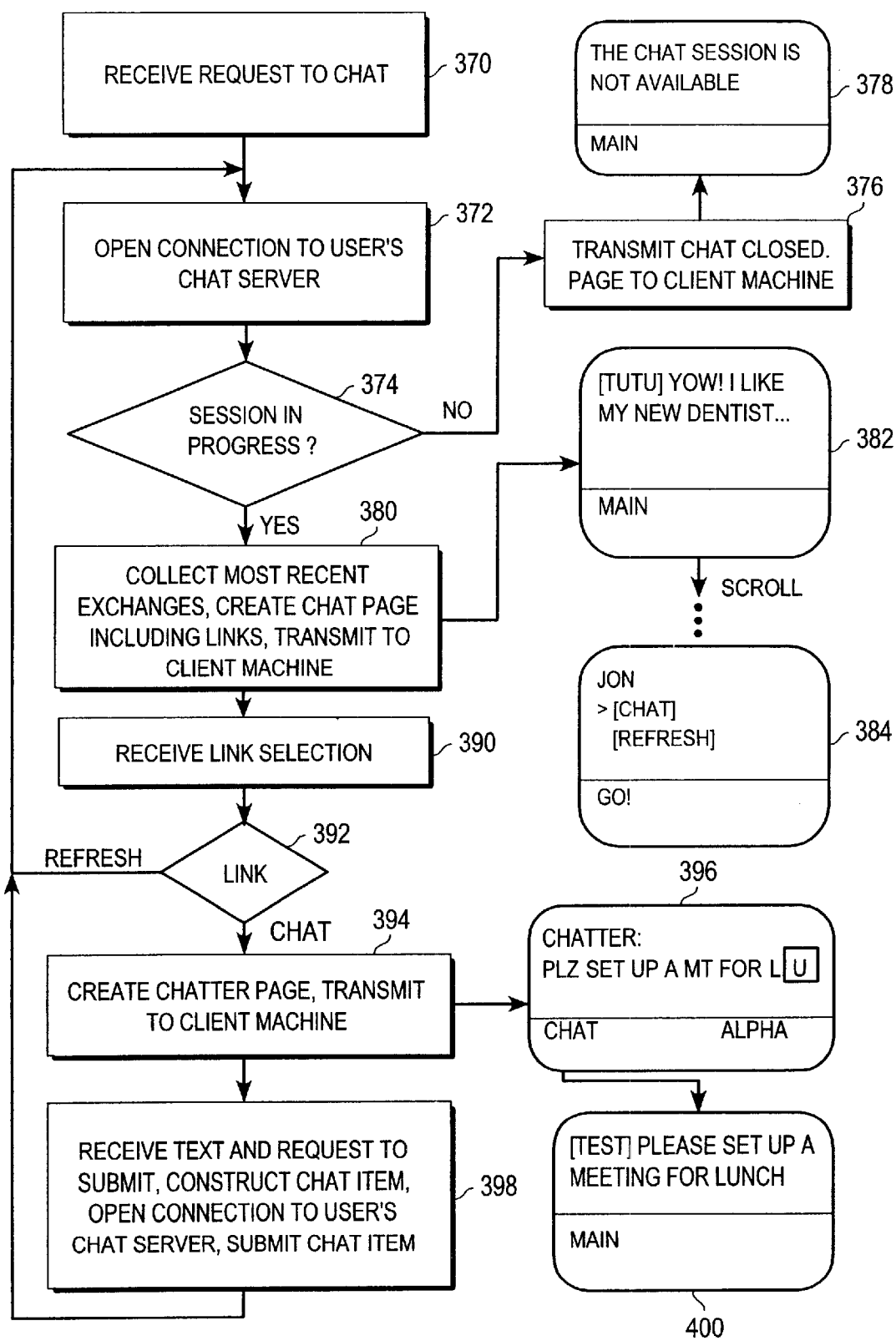
FIG. 8 is a flowchart showing operations of the IMS of FIG. 4 in response to a request to chat.

FIG. 8 illustrates acts performed by the IMS in response to a request for the "Chat" operation. As above, each act performed by the IMS involves the execution of one or more servlets. FIG. 8 also suggests acts performed by client machine 220, running a counterpart WAP client that supports the "Chat" service.

In box 370, the IMS receives the request for the "Chat" operation from client machine 220. In response, the IMS opens a secure connection to user's server subsystem 212, as described above. In order to perform the "Chat" operation, the IMS opens a connection to the user's chat server, in box 372. Identifying information for a user's chat server can be stored in advance as part of the user's IMS profile. The IMS determines in box 374 whether a chat session is in progress and, if not, transmits a chat closed page to client machine 220 in box 376. Display image 378 illustrates an example of a chat closed page.

If a chat session is in progress, the IMS collects the most recent exchanges from the chat server, in box 380. Using the collected exchanges, the IMS creates a chat page, including links allowing a user to add some "chatter" to the conversation or view the latest chat. The link to view the latest chat is necessary because the "Chat" operation is not automatically updating, due to limitations in the current WAP standard—there is no way in WAP 1.1 to notify interested parties when the page they are viewing has been updated. The IMS transmits the chat page with included links to client machine 220.

An example of a chat page in response to a "Chat" request is shown by display images 382 and 384. A first part of the page, shown in image 382, shows an item of "chatter" that was collected in box 380. By scrolling, the user can reach a closing part of the page, shown in image 384, which shows the end of the final item of "chatter", followed by a list of links. The list includes a "Chat" link enabling the user to add "chatter" to the conversation and a "Refresh" link enabling the user to view an updated chat page. As above, client machine 220 also presents a ">" symbol as a cursor to indicate the current selection within the list, with the first link in the list being the default current selection. When a desired link is the current selection, the user can press a button adjacent the "Go!" label to request that the client machine 220 transmit a request to the IMS to follow the desired link.

In box 390, the IMS receives a request to follow a selected link, and in box 392, the IMS branches based on the link selected. If the "Refresh" link was selected, the IMS returns to box 372, reestablishing connection to the chat server. But if the "Chat" link was selected, the IMS creates a chatter page and transmits it to client machine 220, in box 394. Display image 396 illustrates an example of a chatter page, in which the user has entered a shorthand version of the text "Please set up a meeting for lunch". If the user then presses a button adjacent the "Chat" label, client machine 220 transmits to the IMS a request to submit the expanded version of the entered text to the conversation.

In response to the request and the shorthand version of the text, the IMS expands the text and constructs a chat item using the text, in box 398. The IMS then contacts the user's chat server as in box 372 and submits the chat item. The IMS can then return to the test in box 374 and, if the chat item was successfully submitted, the chat page created in the next iteration of box 380 should include the submitted chat item, as illustrated by display image 400. The chat page shown in image 400 shows the user's "chat handle", a nickname which is "test" in the example, followed by the expanded version of the shorthand text from image 396.

The View Calendar Operation

In one embodiment, the top-level menu always includes the "View calendar" operation. It is increasingly common for users to keep their personal schedules on a network server to make it easy for others to schedule appointments with them. Although there is not yet an Internet standard for networked calendars, conventional networked calendars implement the following simple functions: (i) Schedule a new appointment, given a date, start time, end time, and meeting description; (ii) delete an appointment, given a unique identifier such as an appointment number for the appointment; and (iii) list all appointments on a given day, and return a unique identifier such as an appointment number for each appointment. In one embodiment, the IMS provides a calendar service that includes these three functions.

Figure 9:
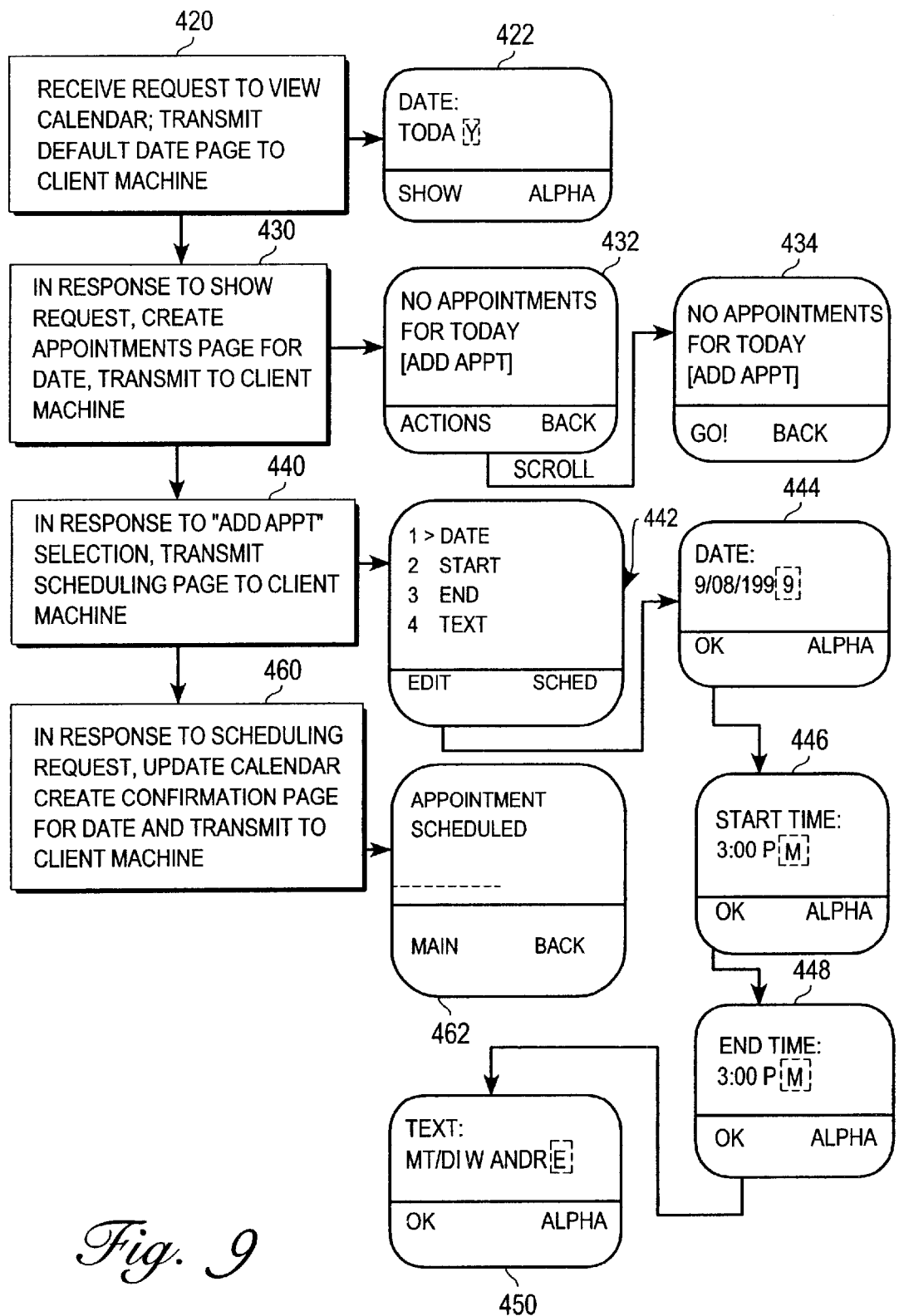
FIG. 9 is a flowchart showing operations of the IMS of FIG. 4 in response to a request to view calendar.

FIG. 9 illustrates acts performed by the IMS in response to a request for the "View calendar" operation. As above, each act performed by the IMS involves the execution of one or more servlets.

In box 420, the IMS receives the request for the "View calendar" operation from client machine 220. In response, the IMS transmits a default date page to client machine 220, requesting that the user indicate the desired calendar date and already completed with a default date that the user can enter by a single button push. Display image 422 illustrates an example of a default date page in which the default date is "today". The user can edit the default date page to include another date. When the desired date is on the default date page, the user can press a button adjacent the "Show" label to request that client machine 220 transmit a request to the IMS to show a list of appointments for the desired date.

In response to a request to show a list of appointments for a date, the IMS creates an appointments page for the date and transmits the appointments page to client machine 220. Display images 432 and 434 show an example of an appointments page. A first version of the page, shown in image 432, indicates that no appointments have been scheduled for today and includes a link labeled "Add appt" which can be followed to add an appointment. In a second version of the page, shown in image 434, the user has scrolled to position a ">" symbol as a cursor to indicate selection of the link labeled "Add appt". The user can press a button adjacent the "Go!" label to request that the client machine 220 transmit a request to the IMS to follow the selected link.

In box 440, the IMS responds to the request to follow the selected link by transmitting a scheduling page to client machine 220. Display image 442 illustrates an example of a first subpage of a scheduling page. The first subpage is presented by client machine 220 as a list of numbered items, each item including a short description of an item of information relating to an appointment. As above, client machine 220 also presents a ">" symbol as a cursor to indicate the current selection, with the first item in the list being the default current selection. When a desired item is the current selection, the user can press a button adjacent the "Edit" label to request an opportunity to edit the item.

Display images 444, 446, 448, and 450 illustrate a sequence of subpages of the scheduling page. Display image 444 shows a subpage in which the user has edited the "Date" item, entering the value "9/08/1999". The user may then press a button adjacent the "OK" label to return to the first subpage and select another item.

Display image 446 shows a subpage in which the user has edited the "Start time" item, entering the value "3:00PM". As above, the user may again press a button adjacent the "OK" label to return to the first subpage and select another item.

Display image 448 shows a subpage in which the user has edited the "End time" item, entering the value "3:00 PM". As above, the user may again press a button adjacent the "OK" label to return to the first subpage and select another item.

Display image 450 shows a subpage in which the user has edited the "Text" item, entering a shorthand version of the text "Meeting/dinner with Andre". As above, the user may again press a button adjacent the "OK" label to return to the first subpage and select another item.

When the user wishes to schedule an appointment, the user may press a button adjacent the "Sched" label in the first subpage. In response, client machine 220 transmits a request to the IMS to schedule an appointment according to the information entered in the scheduling page.

In response to the request, the IMS updates the calendar in accordance with the information entered in the scheduling page, in box 460. In updating the calendar, the IMS can expand the shorthand version of the text. The IMS also creates a confirmation page that can include an updated list of appointments for the selected date, and transmits the confirmation page to client machine 220.

Display image 462 illustrates a confirmation page which does not include an updated list of appointments. As in the other examples above, the user can press a button adjacent the "Main" label to return to the top-level menu.

The Look Up Name Operation

In one embodiment, the top-level menu always includes the "Look up name" operation. Users typically have one or more databases of information about other users, which may be referred to as address books, contact lists, or personal directories. As used herein, the term "address book" includes all of these types of databases.

A user will find it advantageous to keep a single copy of the user's address book on the user's network server, rather than incurring the extra work necessary to keep several versions that must be synchronized to make it easy for others to schedule appointments with them. The IMS makes it easy to keep a single address book by including the ability to interact with LDAP servers, which are designed to serve address book information to any client that speaks the LDAP protocol. Programs that speak the LDAP protocol include Netscape Messenger and Microsoft Outlook Express.

Figure 10:
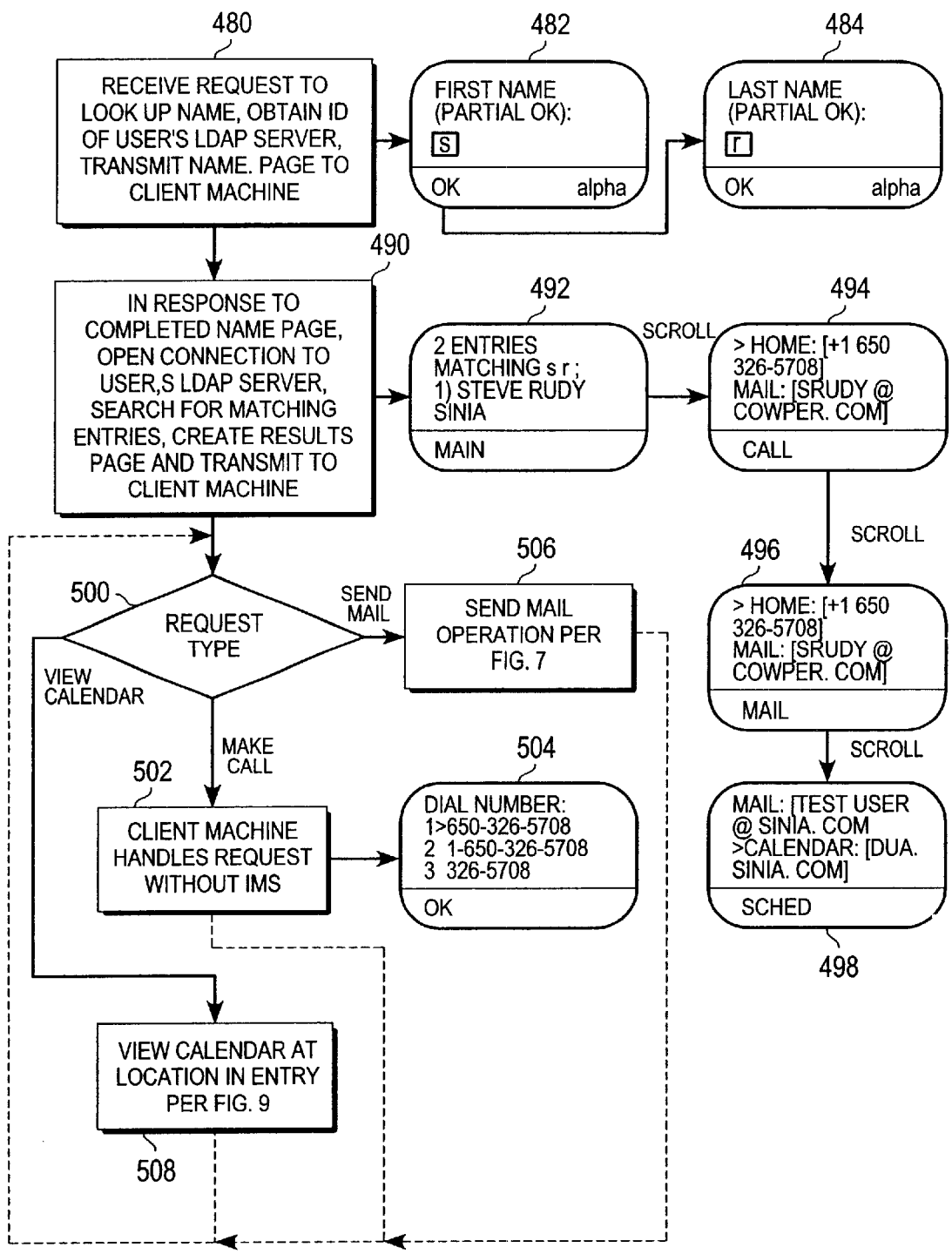
FIG. 10 is a flowchart showing operations of the IMS of FIG. 4 in response to a request to look up name.

FIG. 10 illustrates acts performed by the IMS in response to a request for the "Look up name" operation. As above, each act performed by the IMS involves the execution of one or more servlets.

In box 480, the IMS receives the request for the "Look up name" operation from client machine 220. In response, the IMS accesses previously stored information in memory 234 about the user to obtain an identifier (ID) of the user's preferred LDAP server and other parameters; the user could have loaded the previously stored information into memory 234 through a user interface provided by the IMS through user's server system 212. In addition, the IMS transmits a name page to client machine 220, allowing the user to enter a complete or partial desired name for searching the user's address book database.

Display images 482 and 484 illustrate an example of a name page in which the user has entered a partial first name (or given name) string and a partial last name (or surname) string. A first part of the name page, shown in display image 482, is headed "First Name (partial OK)", and the user has entered a first name string that includes only the character "s" in the example. The user can press a button adjacent the "OK" label in the first part of the name page to complete entry of the first name string and obtain a second part of the name page, shown in display image 484. The second part is headed "Last Name (partial OK)", and the user has entered a last name string that includes only the character "r" in the example. The user can press a button adjacent the "OK" label in the second part of the name page to complete entry of the last name string and to request that client machine 220 transmit a request to the IMS to search the user's address book database with the entered strings.

In response to a request to search the user's address book database with first and last name strings, the IMS opens a connection to the user's LDAP server and searches for entries with names that satisfy a matching criterion when compared with the entered strings, in box 490. The IMS creates a results page based on the results of the search and transmits the results page to client machine 220. In one embodiment, address book entries can include a person's name, a company name, a postal address, one or more e-mail addresses, a home telephone number, an office telephone number, a fax number, a pager number, a calendar location, a preferred chat session, and a server identifier. The IMS can use some of these items of information to create the results page, as described below, and can ignore other items.

According to one embodiment, the following two-part matching criterion is used by the IMS: Under a string input subcriterion, if the user enters strings that include no characters for both names, a result is returned indicating that no entries in the database match, because this is likely to be an input error. Otherwise a substring match subcriterion applies, so that an entry matches only if both its first name includes a substring that matches the entered first name string, disregarding case, and also its last name includes a substring that matches the entered last name string, again disregarding case. In the illustrated example, this matching criterion would be satisfied by all entries with "s" in the first name and "r" in the last name. If the user enters a string that includes no characters, i.e. an empty string, for one (but not both) of the names, then every entry would include a matching substring for that name, i.e. the empty substring.

Display images 492, 494, 496, and 498 show an example of a results page.

A first part of the results page, shown in image 492, indicates that the database includes two entries that match the entered strings, "s" and "r". The first part of the results page also shows the beginning of a list of the matching entries, in which each entry begins with a number and identifying information the IMS has extracted from the entry. In the illustrated example, the first entry's identifying information includes the person's name, "Steve Rudy", and the company name, "Sinia". Following the identifying information is a series of items from which the user can select to request actions.

Second and third parts of the results page, shown respectively in display images 494 and 496, can be reached by scrolling downward from the first part to position a ">" symbol as a cursor to indicate selection of one of two links labeled "Home" and "Mail". The link labeled "Home" includes the home telephone number from the entry, and the link labeled "Mail" includes one of the e-mail addresses from the entry. If the cursor indicates selection of the link labeled "Home", a "Call" label is also presented and the user can press a button adjacent the "Call" label to request that the client machine 220 request the standard WAP "make call" function. If the cursor indicates selection of the link labeled "Mail", a second "Mail" label is presented and the user can press a button adjacent the second "Mail" label to request a "Send mail" operation as described above in relation to FIG. 7 for the e-mail address in the link. As mentioned in relation to FIG. 7, image 344 would include an e-mail address by default, in this case the selected e-mail address from the results page.

A fourth part of the results page, shown in display image 498, can be reached by scrolling downward from the second or third part and by then positioning the cursor to indicate selection of a link labeled "Calendar". With this selection, a "Sched" label is also presented and the user can press a button adjacent the "Sched" label to request the "View calendar" operation described above in relation to FIG. 9, but accessing the calendar at the location from the entry rather than the user's own calendar.

While the results page is being presented, the IMS thus branches based on the type of request the user makes, in box 500. Some types of requests are illustrated in FIG. 10, though others could also be available.

If the user requests a "make call" function, client machine 220 handles the request without the IMS, in box 502. Display image 504 illustrates a make call page that client machine 220 could store at an appropriate location such as wtai://wp/mc and could present in response to the user's request; as shown, image 504 includes a list of dialing options from which the user can select by positioning a cursor. Then, the user can press a button adjacent an "OK" label to request that client machine 220 place a call using the selected dialing option through carrier's network 204. While client machine 220 has control of the make call operation, it could terminate connection to the IMS, and the IMS could wait for reconnection by client machine 220, while saving the user's current state in the IMS user interface. For example, a phone browser running on client machine 220 could reconnect to the IMS automatically upon hang up or could again present the results page as in image 492, allowing the user to press a button adjacent the "Main" label to initiate reconnection.

If the user requests a "Send mail" operation or a "View calendar" operation, the IMS provides the requested operation, in box 506 or box 508, respectively.

When the response to each request is completed, client machine 220 can again display the results page, either immediately or after another log in operation, so that the user can make another request, as suggested by the dashed lines from boxes 502, 506, and 508 back to box 500. For example, the user could begin by requesting a "make call" function to the home telephone number in display image 494; after placing the telephone call, the user could return to display image 496 and request a "Send mail" operation to the e-mail address in the entry, or, alternatively, the user could return to display image 498 and request a "View calendar" operation accessing the calendar at the location in the entry.

Transferring E-mail Attachments for Rendering

The general features described above could be implemented in many ways within the context of the top-level IMS operations described above. In one embodiment, the general features are implemented as an extension of the "Read mail" operation.

Figure 11:
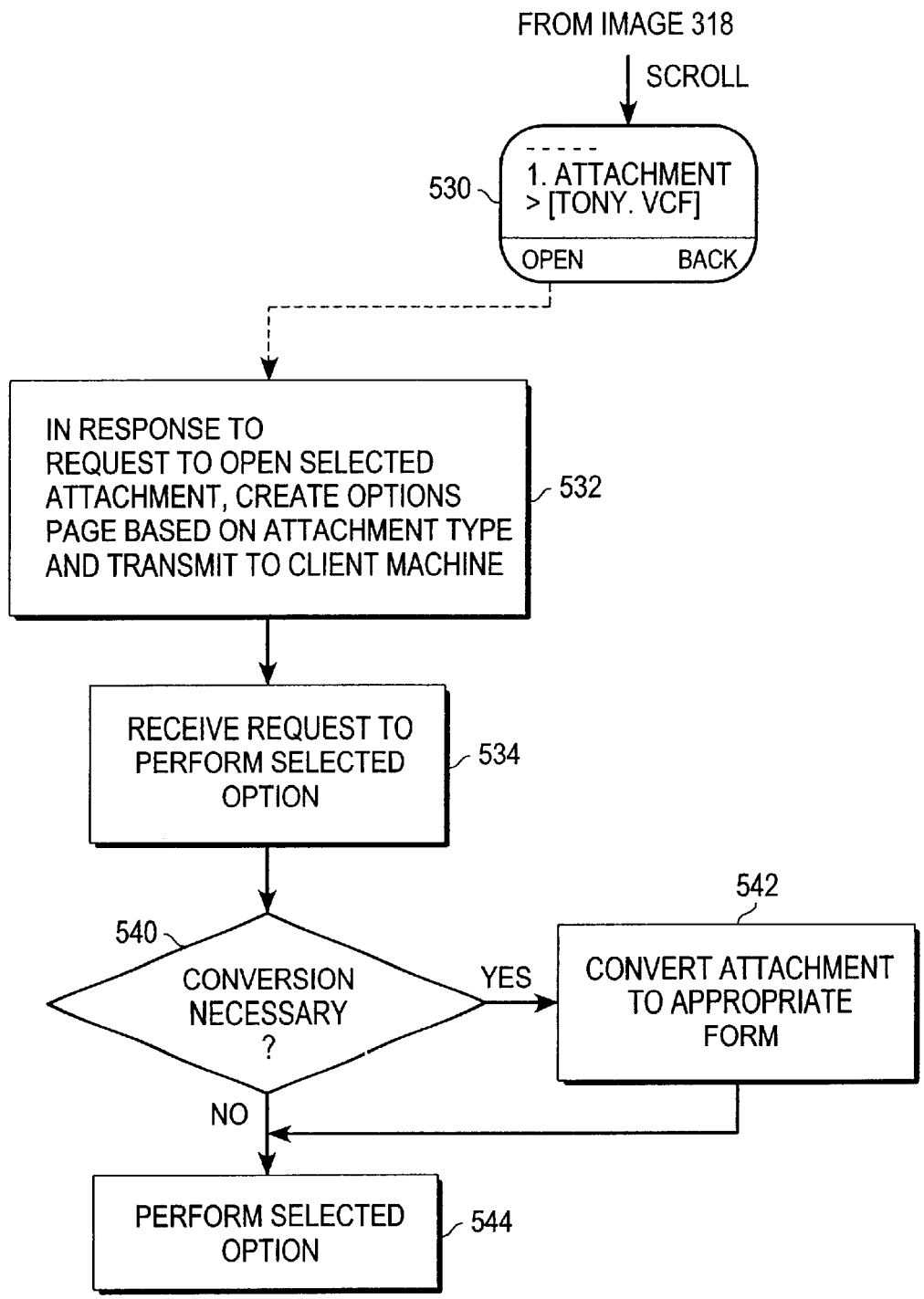
FIG. 11 is a flowchart showing operations of the IMS of FIG. 4 in relation to e-mail attachments.
Figure 12:
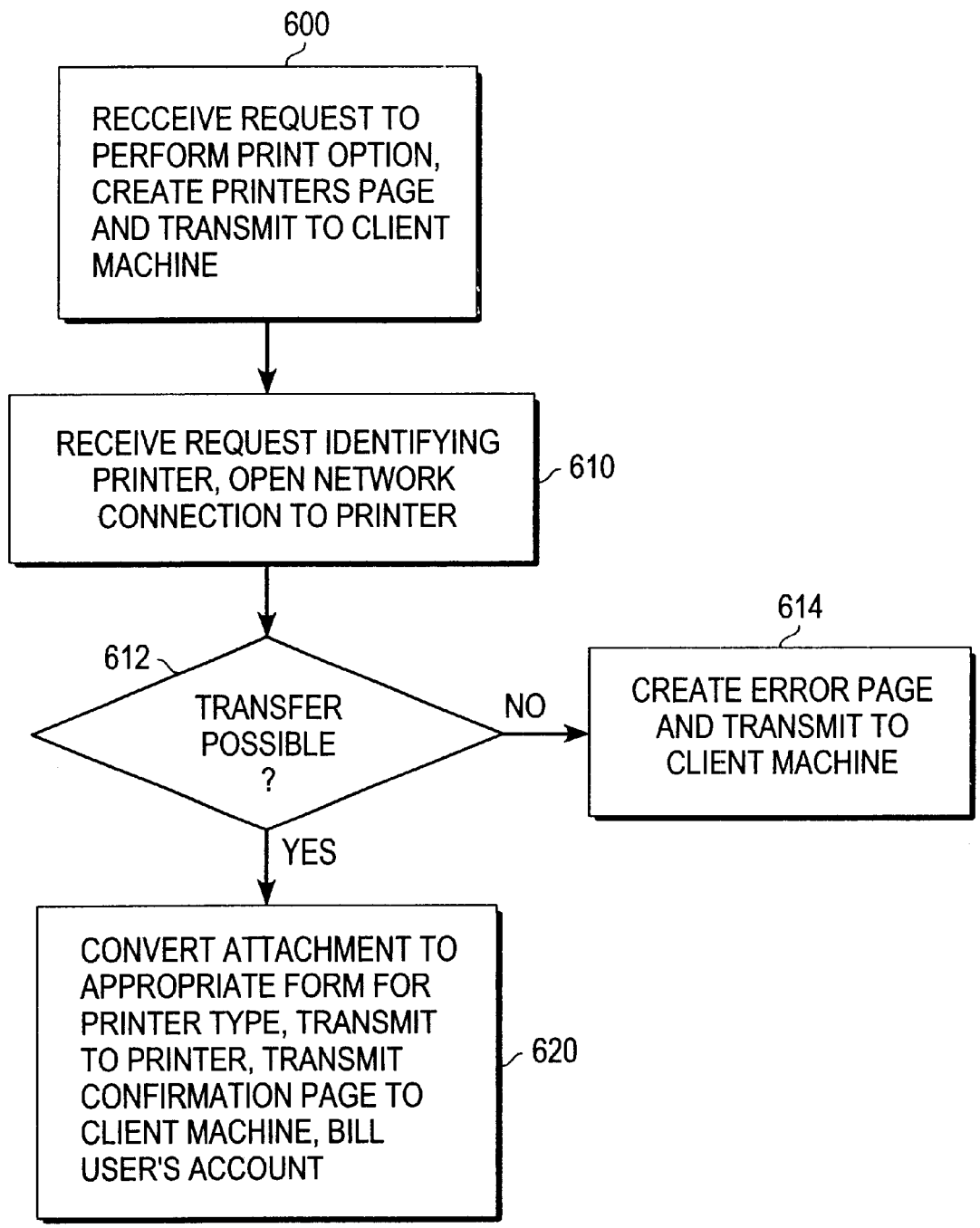
FIG. 12 is a flowchart showing in greater detail how the IMS responds to a print request received in box 534 in FIG. 11.
Figure 13:
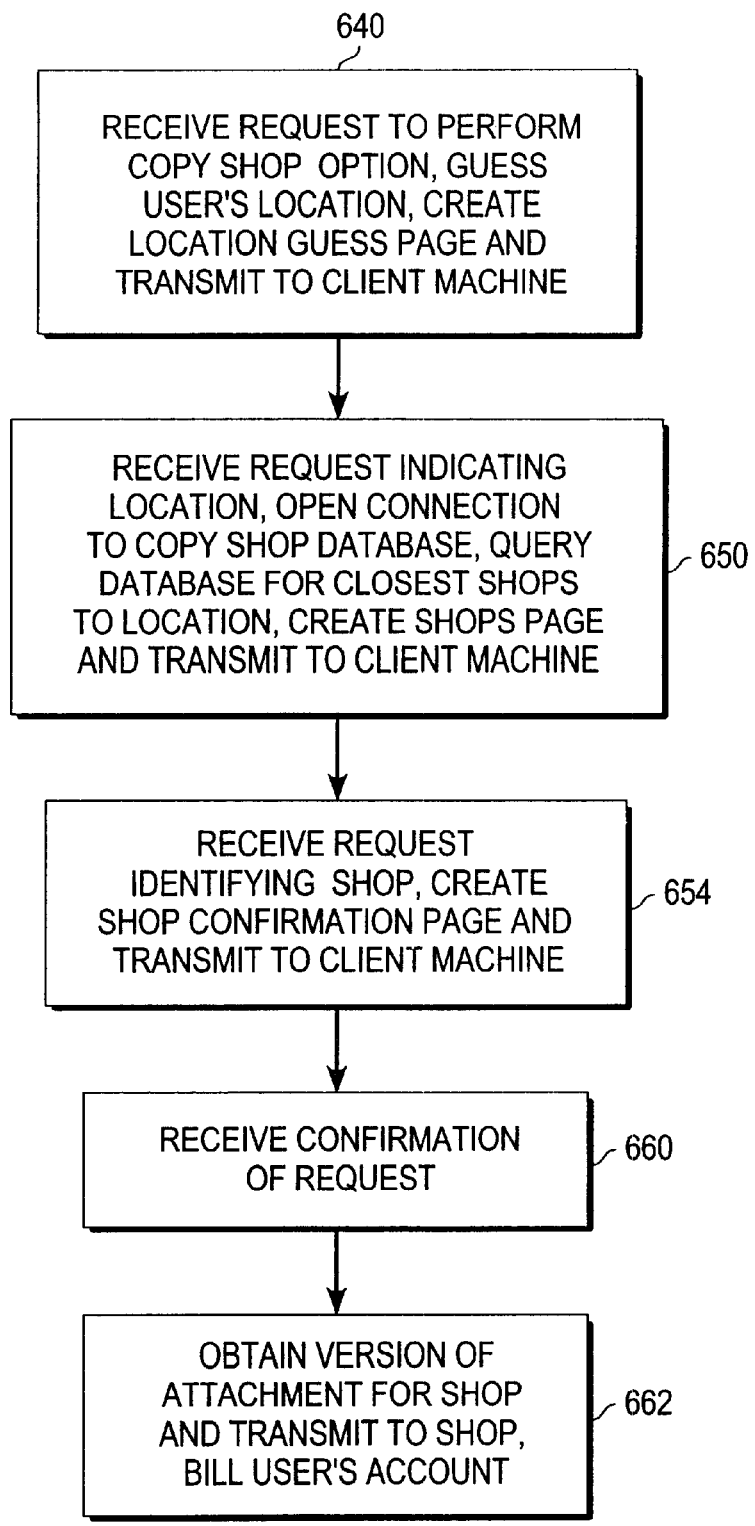
FIG. 13 is a flowchart showing in greater detail how the IMS responds to a copy shop request received in box 534 in FIG. 11.
Figure 14:
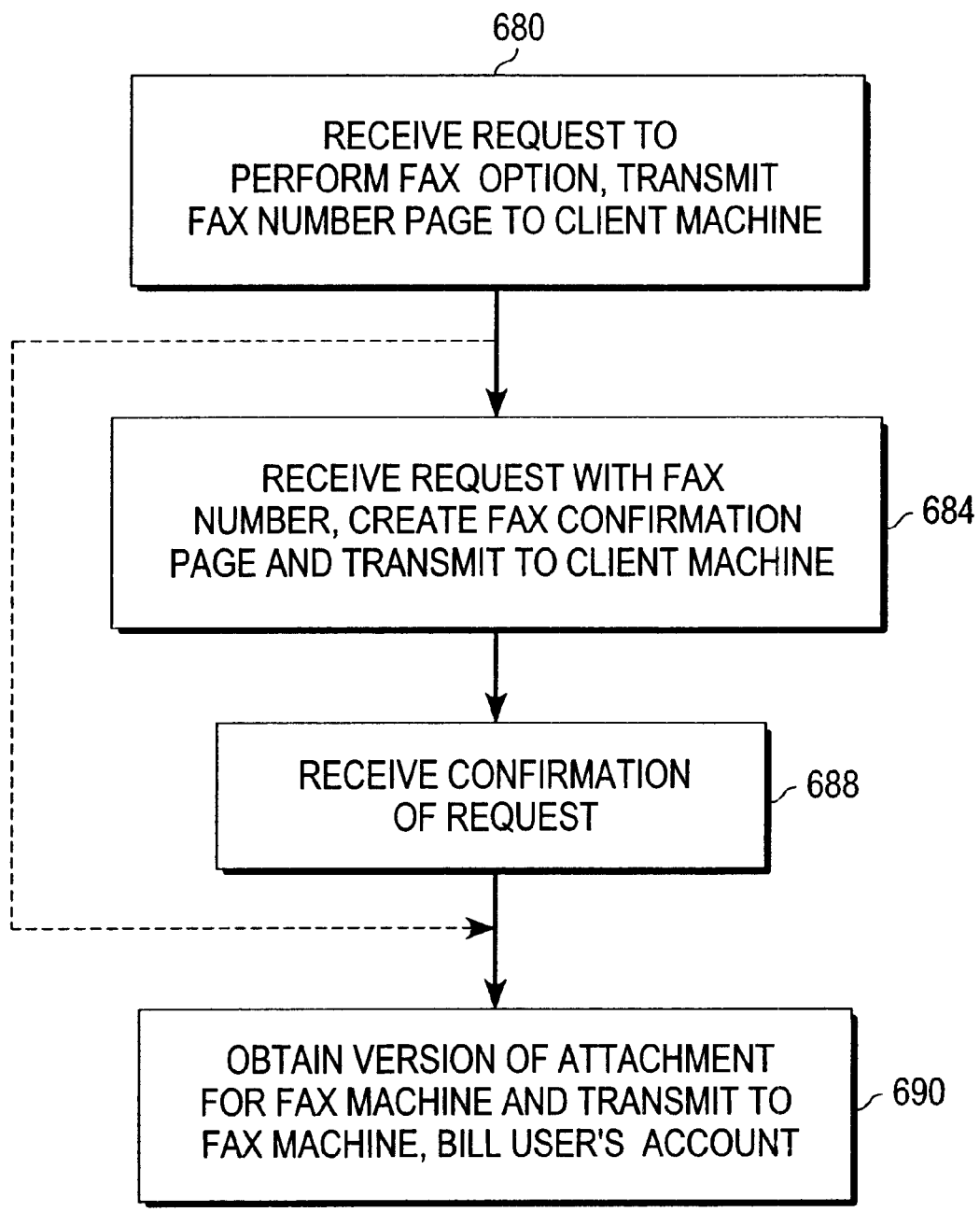
FIG. 14 is a flowchart showing in greater detail how the IMS responds to a fax request received in box 534 in FIG. 11.
Figure 15:
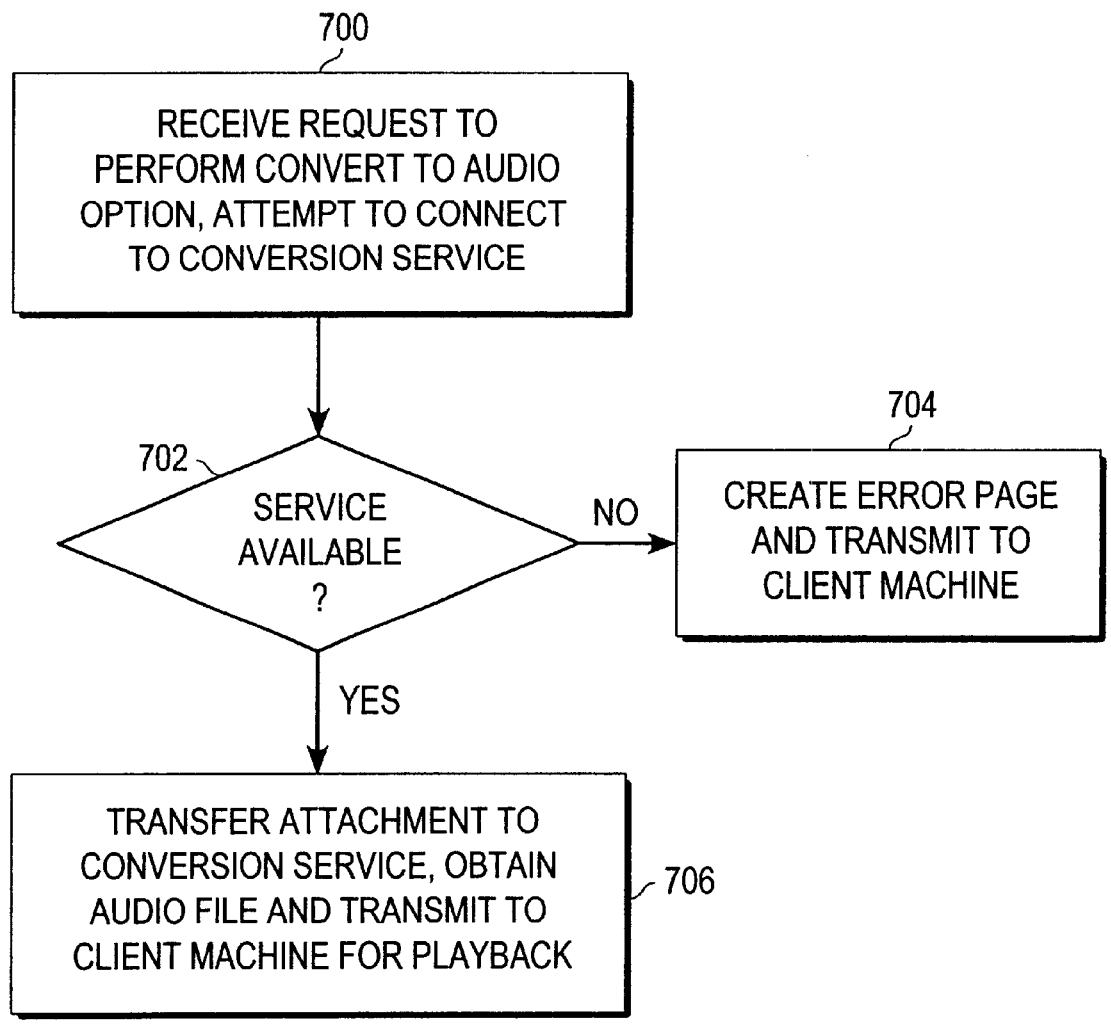
FIG. 15 is a flowchart showing in greater detail how the IMS responds to a convert to audio request received in box 534 in FIG. 11.
Figure 16:
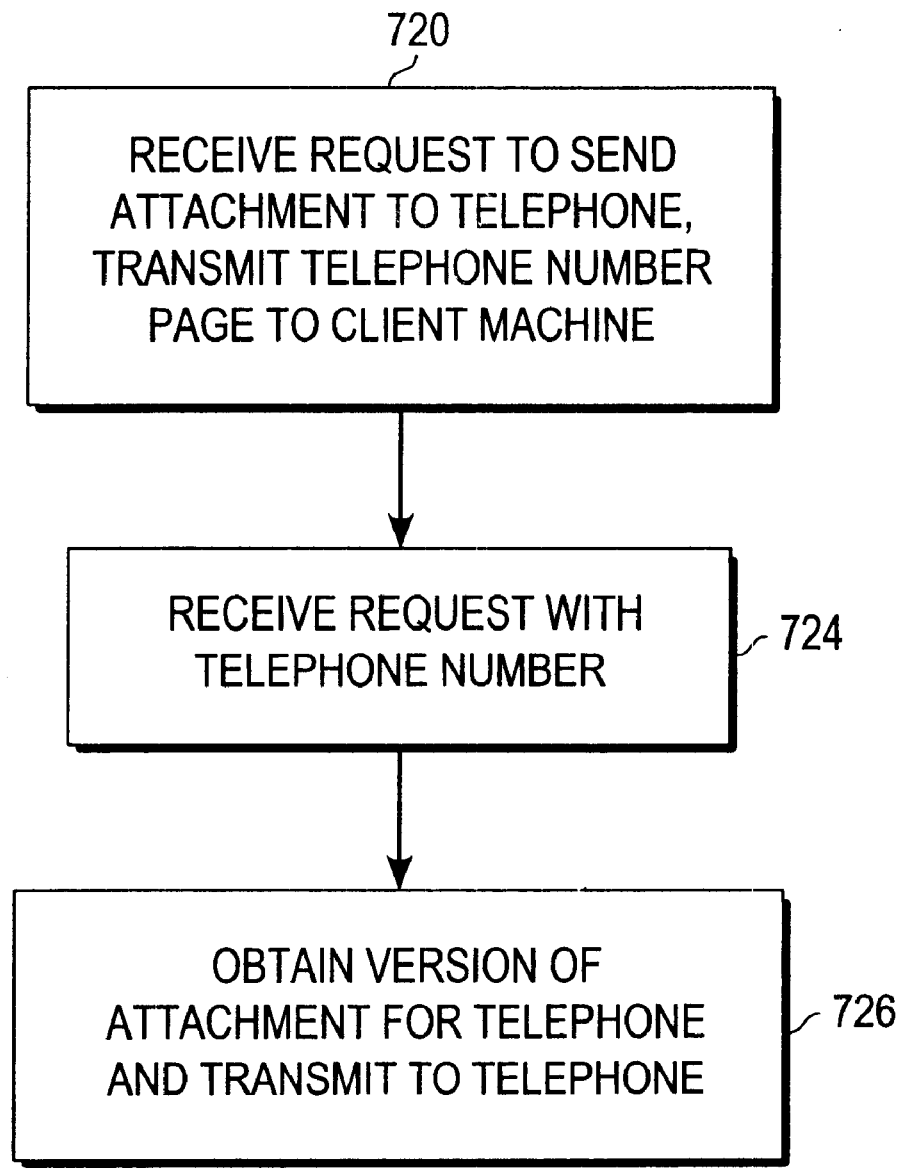
FIG. 16 is a flowchart showing in greater detail how the IMS responds to a listen request received in box 534 in FIG. 11.

FIG. 11 illustrates how the "Read mail" operation shown in FIG. 6 can be extended to transfer e-mail attachments for rendering. FIG. 12 illustrates how the IMS can render an image attachment on a networked printer. FIG. 13 illustrates how the IMS can render an image attachment at a nearby copy or print shop. FIG. 14 illustrates how the IMS can render an image attachment on a nearby facsimile machine. FIG. 15 illustrates how the IMS can convert a text attachment to audio for rendering on a telephone. FIG. 16 illustrates how the IMS can render an audio attachment.

Display image 530 in FIG. 11 illustrates an additional part that can be added to the formatted message page described above in relation to display images 316 and 318 in FIG. 6 when the selected message includes an attachment. As shown, the additional part can be reached by scrolling down from the part shown in display image 318. The additional part begins with a line that indicates the number of attachments, illustratively one. Then the additional part includes a list of links, one for each attachment. Each attachment's link can begin and end with a link delimiter, illustratively square brackets, and the link can include the attachment's file name. In the illustrated example, the only attachment link is "[tony.vcf]".

When implemented to create and transmit a formatted message page as illustrated, the act in box 314 in FIG. 6 thus implements the general act in box 100 in FIG. 2. For example, in creating the formatted message page for a selected message, the act in box 314 could detect whether the message has an attachment by determining from its content type and related headers whether it is a MIME multipart message. If so, the act in box 314 could obtain a number of attachments based on a count of parts of the message and could also obtain each attachment's file name from the headers. With this information, the act in box 314 could create the part of the formatted message page shown in image 530.

As above, client machine 220 also presents within display image 530 a ">" symbol as a cursor to indicate the current selection, with the first item in the list of attachment links being the default current selection, as shown. When a desired attachment's link is the current selection, the user can press a button adjacent the "Open" label to cause client machine 220 to request a list of options that can be performed in relation to the selected attachment.

In box 532, the IMS responds to such a request by first creating an options page based on the MIME type of the selected attachment and by then transmitting the options page to client machine 220. The list on the options page can be an appropriate subset of all available options.

The available options can, for example, include "Fwd by email", "Print", "Copy shop", "Fax", "Convert to audio", and "Listen". The "Fwd by email" option can be appropriate for all types of attachments. The "Print", "Copy shop", and "Fax" options can be appropriate for all attachments of types that define images, such as image/* files, text/* files, application/rtf files, application/x-tex files, application/pdf files, Excel spreadsheets, PowerPoint slides, and so forth. The "Convert to audio" option can be appropriate for all attachments of types that define text, such as text/* files, application/pdf files, and so forth. The "Listen" option can be appropriate for all attachments of types that define audio, such as MP3 files, Sun AU files, Real Audio files, Microsoft WAV files, and so forth.

It follows that the options page for a text attachment, such as an HTML file, can include "Fwd by email", "Print", "Copy shop", "Fax", and "Convert to audio". Similarly, the options page for an image attachment that is not a text attachment, such as a JPEG image file, can include "Fwd by email", "Print", "Copy shop", and "Fax". The options page for an audio attachment, such as an AU audio file, can include "Fwd by email" and "Listen". A default options page for an attachment of some other type, such as the MIME type application/octet-stream for attachments of unknown type, can include only "Fwd by email".

Before including the "Convert to audio" option in an options page, the IMS can test whether client machine 220 includes a rendering device that can render an audio file. For example, the client could be a wireless telephone that can render audio attachments.

The options page can also include a top line with the attachment's file name and the number of bytes in the attachment. The options page can be presented by client machine 220 as a list of items, each item including the short description of an available option. As above, client machine 220 can also present a ">" symbol as a cursor to indicate the current selection, with the first item in the list being the default current selection. When a desired option is the current selection, the user can press a button adjacent a "Go!" label to cause client machine 220 to request that the IMS perform the desired option.

In box 534, the IMS receives a request from client machine 220 to perform a selected option. In response to the request, the IMS branches in box 540 based on whether the attachment must be converted. If so, the IMS converts the attachment to a form appropriate for the selected option, in box 542. In either case, the IMS performs the selected option in box 544.

If the selected option is "Print", "Copy shop", "Fax", "Convert to audio", or "Listen", each of which includes transferring an attachment for rendering, the act in box 534 is part of the implementation of the general act in box 102 in FIG. 2 and the acts in boxes 540, 542, and 544 are part of the implementation of the general act in box 104. FIGS. 12–16 illustrate in more detail how the acts in boxes 534, 540, 542, and 544 can be implemented for each of these options.

In box 600 in FIG. 12, the IMS receives a request to perform the "Print" option for a selected attachment, thus implementing box 534 in FIG. 1. The IMS responds by creating a printers page and transmitting it to client machine 220. For example, the printers page could include a list of selectable items, each including a short description of a printer. The printers page could also include a prompt following the list for the user to manually enter a fully qualified printer identifier and type, e.g. Postscript, PCL5, etc.; entry of printer type could, however, be omitted if the IMS can perform printer type detection automatically.

The IMS can generate the list to include printer identifiers the user has stored in memory 234 in advance through an appropriate user interface within user's network 202, such as a personal web page. The IMS can also keep a cache of identifiers of a small number of most recently used printers, and can generate the list to include those printer identifiers as well. Before adding a printer to the list, the IMS could determine whether the printer's type is compatible with the type of the attachment.

As above, client machine 220 could also present a ">" symbol as a cursor to indicate the current selection, with the first item in the list being the default current selection. When a desired printer is the current selection or has been entered at the prompt, the user could press a button adjacent an appropriate label to cause client machine 220 to request that the attachment be sent to the desired printer.

After receiving such a request, in box 610, the IMS opens a network connection to the printer. If the act in box 612 determines that it is not possible to transfer the attachment to the printer, the IMS creates an error page and transmits it to client machine 220, in box 614.

If transfer to the printer is possible, the IMS converts the attachment to the appropriate language for printing on the printer's type and transmits the converted attachment to the printer, in box 620, thus implementing boxes 540, 542, and 544 in FIG. 11. If necessary to enable the IMS to convert the attachment, the IMS may obtain additional information interactively through client machine 220. Upon transmitting the converted attachment, the IMS also transmits a confirmation page to client machine 220 and bills the user's account with the provider for the service of forwarding the attachment.

In box 640 in FIG. 13, the IMS receives a request to perform a "Copy shop" option for a selected attachment, thus implementing the act in box 534 in FIG. 11. The IMS responds by guessing the user's location using available information, such as locations the user has stored in memory 234 in advance through an appropriate user interface within user's network 202, a location based on Automatic Number Identification (ANI), and a location obtained from a geographic location system such as GPS, GLONASS, cellular triangulation, or another such system. The IMS creates a location guess page based on the guessed location and transmits it to client machine 220.

The location guess page could include an identifier of a guessed location as well as a prompt allowing the user to manually edit or replace the guessed location identifier with another location identifier if the guessed location is not correct. A location identifier could, for example, be a telephone number, possibly including country code, area code, and local number or a U.S. Postal Service ZIP Code or other postal code and country. The user could press a button adjacent an appropriate label to cause client machine 220 to request that the attachment be sent to a copy shop near the guessed or manually entered location.

Upon receiving such a request, in box 650, the IMS opens a connection to at least one database of copy shops capable of receiving electronic submissions, such as http://www.kinkos.com/, and queries the database for the shop closest to the location. Such databases typically return a list of shops and, for each shop, its address, hours of operation, prices, and other pertinent information. The IMS uses the database results to create a shops page and transmits it to client machine 220. In creating the shops page, the IMS could also use a cache of recently used shops. Before adding a shop to the shops page, the IMS could determine whether the shop is capable of handling the attachment.

According to one embodiment, the shops page includes a list of selectable items, each item including a short description of a shop. As above, client machine 220 could also presents a ">" symbol as a cursor to indicate the current selection, with the first item in the list being the default current selection. When a desired shop is the current selection, the user could press a button adjacent an appropriate label to cause client machine 220 to request that the attachment be transmitted to the desired shop.

Upon receiving such a request, in box 654, the IMS creates a shop confirmation page and transmits it to client machine 220. The shop confirmation page could include a more complete description of the shop and a price estimate for the job, which the IMS can sometimes provide. The description of the shop could include, for example, the address and telephone number of the shop, or these details could alternatively be provided to the user by sending an e-mail message. If the confirmation is acceptable, the user could press a button adjacent an appropriate label to cause client machine 220 to confirm the request to transmit the attachment.

In box 660, the IMS receives such a confirmation. In box 662, the IMS obtains the version of the attachment to be transmitted to the shop and transmits it to the shop. This version may be identical to the attachment in the e-mail message, so that the act in box 662 may only implement the acts in boxes 540 and 544 in FIG. 11. Then the IMS bills the user's account with the provider for the service of forwarding the attachment.

Upon receiving the attachment, the shop should print it. The user can then pay the shop's fee and pick up the printed attachment at the shop.

In box 680 in FIG. 14, the IMS receives a request to perform a "Fax" option for a selected attachment, thus implementing the act in box 534 in FIG. 1. The IMS responds by transmitting a facsimile (fax) number page to client machine 220. The fax number page could include a list of fax machine telephone numbers (fax numbers), previously entered by the user or from a cache of recently used fax numbers. The fax number page could also include a prompt at which the user could manually enter a fax machine's telephone number (fax number). The user could press a button adjacent an appropriate label to cause client machine 220 to request that the attachment be sent to a selected or entered fax number.

Upon receiving the request with the fax number, in box 684, the IMS can create a fax confirmation page and transmits it to client machine 220. The fax confirmation page could include a fax number. If the fax number is correct, the user could press a button adjacent an appropriate label to cause client machine 220 to confirm the request to transmit the attachment. In box 688, the IMS receives the confirmation of the request. Alternatively, as suggested by the dashed line from box 680 to box 690, the creation and transmission of a fax confirmation page and the receipt of confirmation could be omitted.

In box 690, the IMS obtains the version of the attachment to be transmitted to the fax number and transmits it, such as over the public switched telephone network, thus implementing the acts in boxes 540, 542, and 544 in FIG. 11. This version can be a fax format version of the attachment in the e-mail message. Meanwhile, the IMS bills the user's account with the provider for the service of forwarding the attachment.

Upon receiving the attachment, the fax machine should print it. The user can then retrieve the printed attachment from the fax machine.

In box 700 in FIG. 15, the IMS receives a request to perform a "Convert to audio" option for a selected attachment, thus implementing the act in box 534 in FIG. 11. The IMS responds by attempting to connect to a conversion service for converting the attachment to an audio file; such a service may be available through a special telephone number or URL. The IMS branches in box 702 based on whether the conversion service is available. If not, the IMS creates an error page and transmits it to client machine 220, in box 704.

If the conversion service is available, the IMS transfers the attachment to the service to obtain an audio file and then transmits the audio file to client machine 220 for playback, in box 706. The act in box 706 thus implements the acts in boxes 540, 542, and 544 in FIG. 11.

As noted above in relation to FIG. 11, the IMS can determine whether client machine 220 includes a rendering device that can render an audio file before offering the "Convert to audio" option. Alternatively, the act in box 700 or the act in box 706 could include determining that the audio file can be rendered by client machine 220.

In box 720 in FIG. 16, the IMS receives a request to perform a "Listen" option for a selected attachment, thus implementing the act in box 534 in FIG. 11. The IMS responds by transmitting a telephone number page to client machine 220. The telephone number page can include a prompt at which the user can manually enter a telephone number. The telephone number could, for example, be the number of a mobile telephone or a landline telephone or the number of the user's voicemail mailbox. The user can press a button adjacent an appropriate label to cause client machine 220 to request that the attachment be sent to the entered telephone number.

In box 724, the IMS receives the request with the telephone number. Then, in box 726, the IMS obtains the version of the attachment to be transmitted to the telephone number and transmits it, such as over the public switched telephone network. This version can be identical to the attachment in the e-mail message, in which case the act in box 726 only implements the acts in boxes 540 and 544 in FIG. 1. Typically, however, the act in box 706 will include converting the attachment to an appropriate form for playback, with the IMS selecting the converter based on the type of audio file; in this case, the act in box 726 implements the acts in boxes 540, 542, and 544 in FIG. 11.

In box 726, the IMS can also determine whether the telephone number is that of client machine 220, in which case the IMS can determine, before transmitting the attachment, whether client machine 220 includes a rendering device that can render the attachment. For example, the client could be a wireless telephone that can render audio attachments.

As mentioned above, the act in box 314 in FIG. 6, when extended to provide a formatted message page as described above in relation to FIG. 11, implements the general act in box 100 in FIG. 2. Acts shown in FIGS. 11–16 implement the general acts in boxes 102 and 104 in FIG. 2, with acts leading up to and including boxes 610, 660, 688, 700, and 724 implementing the general act in box 102 and with the acts in boxes 620, 662, 690, 706, and 726 implementing the general act in box 104.

According to one embodiment, rather than creating an options page as described in relation to box 532, a page is created that sets forth the attachment's file name, it's MIME type, and its size in bytes. This embodiment demonstrates that it is feasible to use the MIME type of an attachment as described in relation to box 532.

Variations

The implementations described above could be varied in many ways within the scope of the invention. For example, the server machines may have several operating system/ CPU architecture combinations, including Microsoft Windows NT 4.0/Intel x86, Sun Solaris 7/Intel x86, Sun Solaris 7/Sun UltraSPARC, and by running atop an Apache 1.3 Web server, but implementations could be executed on any other appropriate server machines, and the services described could be provided by one or more computers.

An embodiment similar to the above description has been successfully implemented by running a custom set of servlets compiled from Java programming language source code, but implementations could run code of any other appropriate type and compiled from any other appropriate source, such as from other programming languages and environments, including non-object-oriented environments.

An embodiment similar to the above description may be implemented with client machines that are wireless telephones such as Motorola P7389 or a Nokia 7110 telephones, each executing Phone.com's UP Browser 3.1 or UP Browser 4.0. A client machine could be a Palm Pilot V or other PDA using AUSystem's WAP browser to a Palm Pilot V. The PDA can connect to a server, log in, and send e-mail. Implementations could, however, use any other appropriate client machine executing any other Wireless Markup Language (WML) browser or other software by which information can be presented to a user. For example, client machines could include remote or mobile devices such as cellular telephones, pagers, landline display screen telephones, settop boxes, general purpose computers, and so forth.

An embodiment may be implemented using the Internet to provide a communication network and using the WAP protocols, including WML 1.0 and WML 1.1, to present information to and receive information from client machines, but various other communication networks and protocols could be used. For example, instead of the Internet, a private intranet such as leased lines could provide a communication network between provider's network and carrier's network on the one hand and between provider's network and user's network on the other. Or a virtual private network (VPN) could be used as mentioned above, with secure encryption and decryption to create a sort of subnetwork on the Internet.

The implementations described above permit a user to access information stored by the user in a server on the user's network, but a user could access information stored by others and could also access information stored on other networks, whether in a corporate or personal server.

The implementations described above provide a user interface with a specific set of top-level operations implemented in specific ways and with various other operations available in response to selections made by pushing buttons adjacent labels, but various other user interfaces could be provided, with or without top-level operations, with various other sets of top-level operations and other available operations, with the same or similar operations but implemented differently, with different labels adjacent push buttons, or with selection techniques other than pushing buttons.

The implementations described above provide a specific type of version of an e-mail to a client machine with a specific form of descriptor for an attachment, but any appropriate type of version of an e-mail could be provided with any appropriate form of descriptor for an attachment.

The implementations described above receive several specific types of requests to transfer attachments for rendering, but various other types of requests could be received and requests could be received in a variety of ways. Further, the requests result from any of several specific types of user interactions, but requests could result from other types of user interactions, and could possibly be generated automatically by a client machine in appropriate circumstances.

The implementations described above respond to a request to transfer an attachment by obtaining one of several specific types of output version of the attachment and by transferring the output version to a rendering device in one of several specific ways, but various other types of output versions could be obtained and output versions could be transferred in various other ways.

The techniques described herein can be applied in a context in which a provider of intermediary services may collect fees for forwarding e-mail attachments for rendering, but the techniques could be applied in various other contexts.

Hardware Overview

Figure 17:
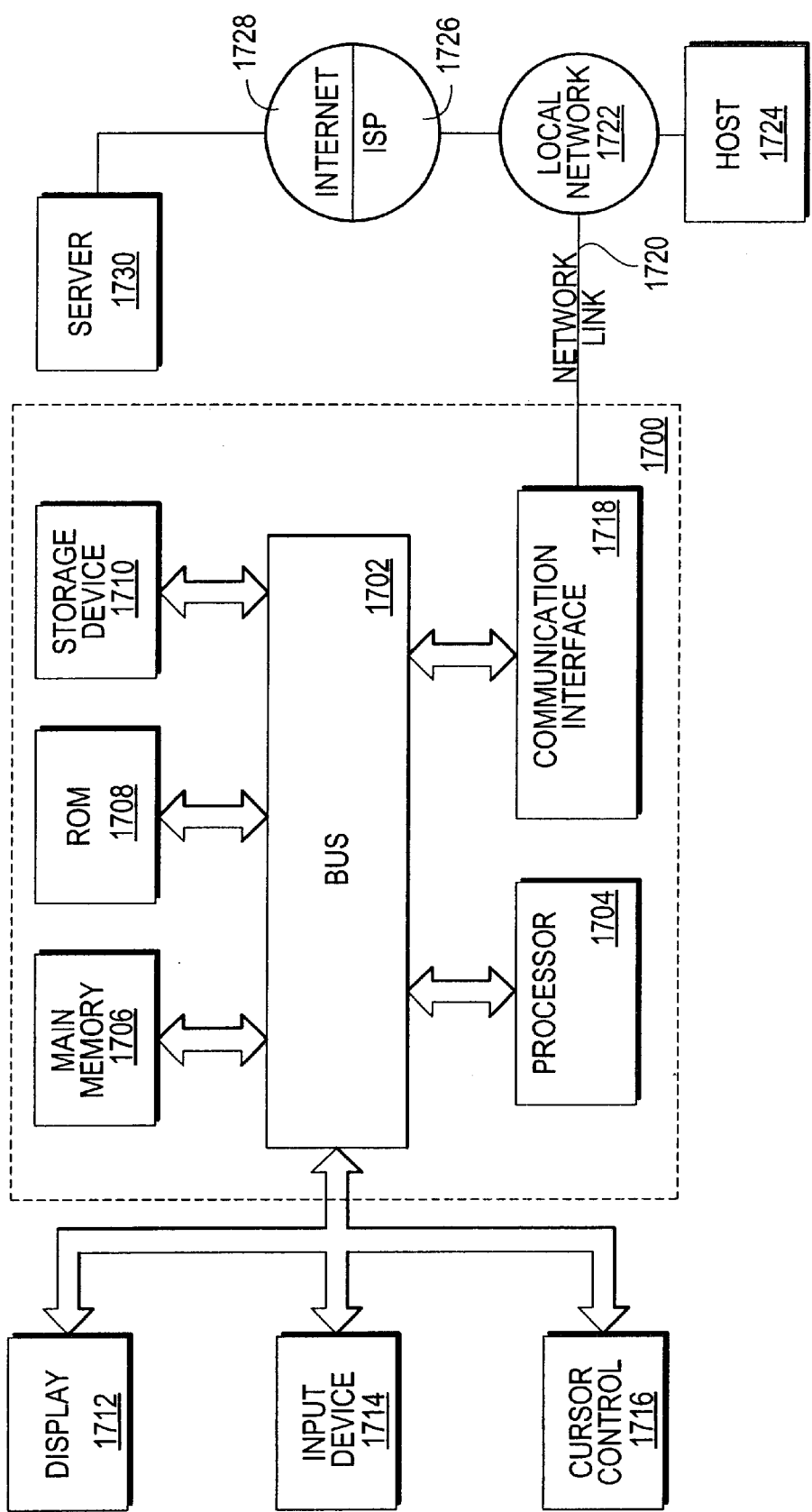
FIG. 17 is a block diagram of a computer system on which embodiments of the invention may be implemented.

FIG. 17 is a block diagram that illustrates a computer system 1700 upon which an embodiment of the invention may be implemented. Computer system 1700 includes a bus 1702 or other communication mechanism for communicating information, and a processor 1704 coupled with bus 1702 for processing information. Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Computer system 1700 further includes a read only memory (ROM) 1708 or other static storage device coupled to bus 1702 for storing static information and instructions for processor 1704. A storage device 1710, such as a magnetic disk or optical disk, is provided and coupled to bus 1702 for storing information and instructions.

Computer system 1700 may be coupled via bus 1702 to a display 1712, such as a cathode ray tube (CRT), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

The invention is related to the use of computer system 1700 for implementing the techniques described herein. According to one embodiment of the invention, those techniques are performed by computer system 1700 in response to processor 1704 executing one or more sequences of one or more instructions contained in main memory 1706. Such instructions may be read into main memory 1706 from another computer-readable medium, such as storage device 1710. Execution of the sequences of instructions contained in main memory 1706 causes processor 1704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1704 for execution. Such a medium may take many forms, including but not limited to, non-volatile media, volatile media, and transmission media. Non-volatile media includes, for example, optical or magnetic disks, such as storage device 1710. Volatile media includes dynamic memory, such as main memory 1706. Transmission media includes coaxial cables, copper wire and fiber optics, including the wires that comprise bus 1702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one o re instructions to processor 1704 for execution. For example, the instructions may initially be carried on a magnetic disk of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are exemplary forms of carrier waves transporting the information.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution. In this manner, computer system 1700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method of presenting e-mail attachments for users who have client machines:

(A) transferring a client version of an e-mail item to a user's client machine for presentation by the client machine, the e-mail item including an attachment, the client version including a user-understandable descriptor of the attachment but not including the entire attachment;

(B) receiving a request from the user's client machine to transfer the attachment for rendering; and (C) in response to the request, obtaining an output version of the attachment and transferring the output version to a rendering device, the output version causing the rendering device to produce a rendered version of the attachment, wherein the rendering device is not the client machine and the client machine has not received the attachment at completion of transferring the output version to the rendering device.

2. The method of claim 1 wherein:

the step of transferring a client version of the e-mail item to the user's client machine is performed in response to determining that said user's client machine is not able to render said attachment; and the method further comprises the steps of:

receiving a second e-mail item that has a second attachment that is a different type of attachment than said attachment;

determining that said user's client machine is able to render said second attachment; and sending said second e-mail with the entire second attachment to said user's client machine.

3. The method of claim 1 in which the client machine has a display and in which the client version is transferred to the user's client machine for presentation on the display, the user-understandable descriptor being visible when the client version is presented on the display.

4. The method of claim 1 in which the client version of the e-mail message includes a first list of one or more selectable items, the user-understandable descriptor being a selectable item in the first list.

5. The method of claim 1 further comprising the steps of:

transferring to the user's client machine a rendering option list of one or more selectable items, each selectable item in the rendering option list indicating a rendering option; and wherein (B) includes receiving a signal from the user's client machine indicating selection of one of the selectable item's in the rendering option list.

6. The method of claim 5 where the step of transferring the rendering option list is performed in response to receiving a signal from the user's client machine indicating selection of the user-understandable descriptor.

7. The method of claim 5 in which the selectable item selected in the list identifies the rendering device.

8. The method of claim 5 in which the selectable item selected in the rendering option list identifies a type of rendering device.

9. The method of claim 1 in which the attachment has a correct rendering that would be obtained if the attachment were correctly rendered and in which (C) comprises:

(C1) obtaining information about the rendering device's type; and (C2) using the information from (C1), converting the attachment to a form that, when transferred to the rendering device, causes the rendering device to produce a rendered version of the attachment that approximates the correct rendering.

10. The method of claim 9 in which (C1) comprises receiving a signal from the user's client machine indicating the rendering device's type.

11. The method of claim 1 in which the request to transfer the attachment for rendering includes information about the rendering device and in which (C) comprises using the information about the rendering device to transfer the output version to the rendering device.

12. The method of claim 11 in which the information about the rendering device indicates a type of rendering device, in which the attachment has a correct rendering that would be obtained if the attachment were correctly rendered, and in which the step of using the information about the rendering device to transfer the output version to the rendering device comprises:

determining whether rendering devices of the indicated type can produce a rendered version of the attachment that approximates the correct rendering; and if rendering devices of the indicated type can produce a rendered version of the attachment that approximates the correct rendering, then converting the attachment to obtain the output version.

13. The method of claim 12 in which the information about the rendering device indicates a type of printer.

14. The method of claim 12 in which the information about the rendering device indicates a type of facsimile machine.

15. The method of claim 11 in which the information about the rendering device includes connection information for establishing a connection with the rendering device and in which the step of using the information about the rendering device to transfer the output version the rendering device comprises using the connection information to transfer the output version to the rendering device.

16. The method of claim 15 in which the connection information includes an Internet Protocol address of the rendering device.

17. The method of claim 15 in which the connection information includes a telephone number of the rendering device.

18. The method of claim 11 in which the user's client machine is near a rendering location at which the rendering device is located and in which (C) comprises:

obtaining information about the location of the user's client machine;

using the information about the location of the user's client machine, selecting the rendering location based on nearness to the user's client machine; and transferring the output version to be rendered on the rendering device.

19. The method of claim 18 further comprising the step of providing the rendering location to the user's client machine for presentation to the user.

20. The method of claim 18 wherein the rendering location is a shop, and the step of transferring the output version to be rendered on the rendering device is performed by transferring the output version to be rendered by said shop.

21. The method of claim 1 in which the user's client machine includes a client rendering device and in which (C) comprises:

in response to the request to transfer the attachment for rendering, determining whether the attachment can be rendered by the client rendering device;

if the attachment can be rendered by the client rendering device, then transferring a third list of one or more selectable items to the client machine for presentation on the client machine's display, the third list including a client rendering item describing transfer to the client rendering device;

receiving a signal indicating selection of the client rendering item; and in response to the signal, obtaining the output version of the attachment in a form appropriate for the client rendering device and transferring the output version to the client machine for rendering by the client rendering device.

22. The method of claim 21 in which the attachment is an audio attachment and the client rendering device is an audio output device that provides audible output in response to audio files; the output version of the attachment being an audio file.

23. The method of claim 1 wherein the user-understandable descriptor includes some but not all content of said attachment.

24. The method of claim 23 wherein:

the attachment includes text; and the user-understandable descriptor includes some but not all of the text of the attachment.

25. The method of claim 23 wherein:

the attachment includes a digital image; and the user-understandable descriptor includes a thumbnail of said digital image.

26. A computer-readable medium carrying instructions for presenting e-mail attachments for users who have client machines, the instructions including instructions for performing the steps of:

(A) transferring a client version of an e-mail item to a user's client machine for presentation by the client machine, the e-mail item including an attachment, the client version including a user-understandable descriptor of the attachment but not including the entire attachment;

(B) receiving a request from the user's client machine to transfer the attachment for rendering; and (C) in response to the request, obtaining an output version of the attachment and transferring the output version to a rendering device, the output version causing the rendering device to produce a rendered version of the attachment, wherein the rendering device is not the client machine and the client machine has not received the attachment at completion of transferring the output version to the rendering device.

27. The computer-readable medium of claim 26 in which the client machine has a display and in which the client version is transferred to the user's client machine for presentation on the display, the user-understandable descriptor being visible when the client version is presented on the display.

28. The computer-readable medium of claim 26 in which the client version of the e-mail message includes a first list of one or more selectable items, the user-understandable descriptor being a selectable item in the first list.

29. The computer-readable medium of claim 26 further comprising instructions for performing the steps of:

transferring to the user's client machine a rendering option list of one or more selectable items, each selectable item in the rendering option list indicating a rendering option; and wherein (B) includes receiving a signal from the user's client machine indicating selection of one of the selectable item's in the rendering option list.

30. The computer-readable medium of claim 29 where the step of transferring the rendering option list is performed in response to receiving a signal from the user's client machine indicating selection of the user-understandable descriptor.

31. The computer-readable medium of claim 29 in which the selectable item selected in the list identifies the rendering device.

32. The computer-readable medium of claim 29 in which the selectable item selected in the rendering option list identifies a type of rendering device.

33. The computer-readable medium of claim 26 in which the attachment has a correct rendering that would be obtained if the attachment were correctly rendered and in which (C) comprises:

(C1) obtaining information about the rendering device's type; and (C2) using the information from (C1), converting the attachment to a form that, when transferred to the rendering device, causes the rendering device to produce a rendered version of the attachment that approximates the correct rendering.

34. The computer-readable medium of claim 33 in which (C1) comprises receiving a signal from the user's client machine indicating the rendering device's type.

35. The computer-readable medium of claim 26 in which the request to transfer the attachment for rendering includes information about the rendering device and in which (C) comprises using the information about the rendering device to transfer the output version to the rendering device.

36. The computer-readable medium of claim 35 in which the information about the rendering device indicates a type of rendering device, in which the attachment has a correct rendering that would be obtained if the attachment were correctly rendered, and in which the step of using the information about the rendering device to transfer the output version to the rendering device comprises:

determining whether rendering devices of the indicated type can produce a rendered version of the attachment that approximates the correct rendering; and if rendering devices of the indicated type can produce a rendered version of the attachment that approximates the correct rendering, then converting the attachment to obtain the output version.

37. The computer-readable medium of claim 36 in which the information about the rendering device indicates a type of printer.

38. The computer-readable medium of claim 36 in which the information about the rendering device indicates a type of facsimile machine.

39. The computer-readable medium of claim 35 in which the information about the rendering device includes connection information for establishing a connection with the rendering device and in which the step of using the information about the rendering device to transfer the output version to the rendering device comprises using the connection information to transfer the output version to the rendering device.

40. The computer-readable medium of claim 39 in which the connection information includes an Internet Protocol address of the rendering device.

41. The computer-readable medium of claim 39 in which the connection information includes a telephone number of the rendering device.

42. The computer-readable medium of claim 35 in which the user's client machine is near a rendering location at which the rendering device is located and in which (C) comprises:

obtaining information about the location of the user's client machine;

using the information about the location of the user's client machine, selecting the rendering location based on nearness to the user's client machine; and transferring the output version to be rendered on the rendering device.

43. The computer-readable medium of claim 42 further comprising the step of providing the rendering location to the user's client machine for presentation to the user.

44. The computer-readable medium of claim 42 wherein the rendering location is a shop, and the step of transferring the output version to be rendered on the rendering device is performed by transferring the output version to be rendered by said shop.

45. The computer-readable medium of claim 26 in which the user's client machine includes a client rendering device and in which (C) comprises:

in response to the request to transfer the attachment for rendering, determining whether the attachment can be rendered by the client rendering device;

if the attachment can be rendered by the client rendering device, then transferring a third list of one or more selectable items to the client machine for presentation on the client machine's display, the third list including a client rendering item describing transfer to the client rendering device;

receiving a signal indicating selection of the client rendering item; and in response to the signal, obtaining the output version of the attachment in a form appropriate for the client rendering device and transferring the output version to the client machine for rendering by the client rendering device.

46. The computer-readable medium of claim 45 in which the attachment is an audio attachment and the client rendering device is an audio output device that provides audible output in response to audio files; the output version of the attachment being an audio file.

47. The computer-readable medium of claim 26 wherein the user-understandable descriptor includes some but not all content of said attachment.

48. The computer-readable medium of claim 47 wherein:
the attachment includes text; and
the user-understandable descriptor includes some but not all of the text of the attachment.

49. The computer-readable medium of claim 47 wherein:
the attachment includes a digital image; and
the user-understandable descriptor includes a thumbnail of said digital image.

50. A computer-implemented method of presenting an e-mail attachment, said method comprising the steps of:

(A) transferring a client version of an e-mail to a client machine, wherein the e-mail includes an attachment and the client version of the e-mail includes a descriptor of the attachment and the client version of the e-mail does not include the attachment;

(B) receiving a request from the client machine to transfer the attachment to a rendering device, wherein the rendering device is not the client machine;

(C) in response to the request received in said step (B), obtaining an output version of the attachment; and (D) transferring the output version to the rendering device, wherein the output version causes the rendering device to produce a rendered version of the attachment, wherein said client machine has not received said attachment at completion of said step (D).

51. The method of claim 50, wherein said rendering device is a device in a set of devices consisting of a facsimile machine, printer, and audio output device.

52. The method of claim 50, wherein said step (A) is performed in response to determining that said client machine is not able to render said attachment, wherein said method further includes the steps of:

(E) receiving a second e-mail having a second attachment that is a different type of attachment than the attachment;

(F) determining that the client machine is able to render the second attachment; and (G) sending the second e-mail to the client machine, wherein the second e-mail item includes the second attachment.

53. The method of claim 50 further including the steps of:

(H) transferring to the client machine a rendering option list of one or more selectable items, wherein each selectable item in the rendering option list identifies a rendering option, wherein said step (B) includes the step of:

(1) receiving a signal from the client machine indicating a selection of a selectable item in the rendering option list, wherein the selectable item identifies the rendering device.

54. The method of claim 50, wherein said step (C) includes the steps of:

(1) obtaining information about a type of the rendering device; and (2) converting the attachment to a form based on the information obtained in said step (C)(1).

55. The method of claim 54, wherein said step (C)(1) includes the step of receiving a signal from the client machine indicating the type.

56. The method of claim 54, wherein the type is a type from a set of types consisting of a printer type and facsimile machine type.

57. The method of claim 54, wherein said step (C) includes the steps of:

(3) obtaining information about a location of the client machine; and (4) using the information about the location of the client machine to select a rendering location based on nearness of the rendering location to the client machine.

58. The method of claim 57, wherein said step (D) includes the step of:

(1) transferring the output version to the rendering device at the rendering location.

59. A computer-readable medium having computer-readable code embodied on said computer-readable medium, said computer-readable code for programming a computer to perform a method for presenting an e-mail attachment, said method comprising the steps of:

(A) transferring a client version of an e-mail to a client machine, wherein the e-mail includes an attachment and the client version of the e-mail includes a descriptor of the attachment and the client version of the e-mail does not include the attachment;

(B) receiving a request from the client machine to transfer the attachment to a rendering device, wherein the rendering device is not the client machine;

(C) in response to the request received in said step (B), obtaining an output version of the attachment; and (D) transferring the output version to the rendering device, wherein the output version causes the rendering device to produce a rendered version of the attachment, wherein said client machine has not received said attachment at completion of said step (D).

60. The computer readable medium of claim 59, wherein said rendering device is a device in a set of devices consisting of a facsimile machine, printer, and audio output device.

61. The computer readable medium of claim 59, wherein said step (A) is performed in response to determining that said client machine is not able to render said attachment, wherein said method further includes the steps of:

(E) receiving a second e-mail having a second attachment that is a different type of attachment than the attachment;

(F) determining that the client machine is able to render the second attachment; and (G) sending the second e-mail to the client machine, wherein the second e-mail item includes the second attachment.

62. The computer-readable medium of claim 59, wherein said method further includes the steps of:

(H) transferring to the client machine a rendering option list of one or more selectable items, wherein each selectable item in the rendering option list identifies a rendering option, wherein said step (B) includes the step of:

(1) receiving a signal from the client machine indicating a selection of a selectable item in the rendering option list, wherein the selectable item identifies the rendering device.

63. The computer-readable medium of claim 59, wherein said step (C) includes the steps of:

(1) obtaining information about a type of the rendering device; and (2) converting the attachment to a form based on the information obtained in said step (C)(1).

64. The computer-readable medium of claim 63, wherein said step (C)(1) includes the step of receiving a signal from the client machine indicating the type.

65. The computer readable medium of claim 63, wherein the type is a type from a set of types consisting of a printer type and facsimile machine type.

66. The computer readable medium of claim 63, wherein said step (C) includes the steps of:

(3) obtaining information about a location of the client machine; and (4) using the information about the location of the client machine to select a rendering location based on nearness of the rendering location to the client machine.

67. The computer readable medium of claim 66, wherein said step (D) includes the step of:

(1) transferring the output version to the rendering device at the rendering location.

* * * * *

UNITED STATES PATENT AND TRADEMARK OFFICE
CERTIFICATE OF CORRECTION

PATENT NO.   : 6,360,252 B1
DATED        : March 19, 2002
INVENTOR(S)  : Rudy

It is certified that error appears in the above-identified patent and that said Letters Patent is hereby corrected as shown below:

Column 30,
Line 51, after "version" and before "the" insert -- to --

Signed and Sealed this

Fourteenth Day of September, 2004

JON W. DUDAS
*Director of the United States Patent and Trademark Office*